(12) United States Patent
Makino et al.

(10) Patent No.: US 11,440,986 B2
(45) Date of Patent: Sep. 13, 2022

(54) SOLID ELECTROLYTE COMPOSITION, BINDER FOR ALL-SOLID-STATE SECONDARY BATTERIES, AND ELECTRODE SHEET FOR BATTERIES AND ALL-SOLID-STATE SECONDARY BATTERY EACH USING SAID SOLID ELECTROLYTE

(71) Applicant: FUJIFILM Corporation, Tokyo (JP)

(72) Inventors: Masaomi Makino, Kanagawa (JP); Hiroaki Mochizuki, Kanagawa (JP); Tomonori Mimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 114 days.

(21) Appl. No.: 16/777,372

(22) Filed: Jan. 30, 2020

(65) Prior Publication Data

US 2020/0181308 A1 Jun. 11, 2020

Related U.S. Application Data

(63) Continuation of application No. 15/079,846, filed on Mar. 24, 2016, now Pat. No. 10,654,963, which is a
(Continued)

(30) Foreign Application Priority Data

Sep. 25, 2013 (JP) .................................. 2013-198786

(51) Int. Cl.
*H01M 10/056* (2010.01)
*C08F 290/06* (2006.01)
(Continued)

(52) U.S. Cl.
CPC ........ *C08F 290/06* (2013.01); *C08G 18/0823* (2013.01); *C08G 18/227* (2013.01);
(Continued)

(58) Field of Classification Search
CPC ........ H01M 4/62; H01M 10/056; H01M 4/13; H01M 4/622; H01M 10/0562;
(Continued)

(56) References Cited

U.S. PATENT DOCUMENTS 6,368,746 B1 4/2002 Takada et al.
2002/0114993 A1 8/2002 Miyaki et al.
(Continued)

FOREIGN PATENT DOCUMENTS

JP 2000-106154 A 4/2000
JP 2000-123874 A 4/2000
(Continued)

OTHER PUBLICATIONS

Communication dated Aug. 2, 2016, issued by the Japan Patent Office in corresponding Japanese Application No. 2014-190589.
(Continued)

*Primary Examiner* — James Lee
(74) *Attorney, Agent, or Firm* — Sughrue Mion, PLLC

(57) ABSTRACT

Provided are a solid electrolyte composition including: an inorganic solid electrolyte having conductivity of an ion of metal belong to Group 1 or 2 in the periodic table; and a high polymer binder, in which the high polymer binder is formed of a polymer having a hard segment and a soft segment, a binder for all-solid-state secondary batteries, and an electrode sheet for batteries and an all-solid-state secondary battery each using the solid electrolyte composition.

14 Claims, 1 Drawing Sheet

Related U.S. Application Data continuation of application No. PCT/JP2014/075398, filed on Sep. 25, 2014.

(51) Int. Cl.

| | |
|---|---|
| *C08G 69/26* | (2006.01) |
| *H01M 4/62* | (2006.01) |
| *H01M 10/0562* | (2010.01) |
| *H01M 4/13* | (2010.01) |
| *C08G 73/10* | (2006.01) |
| *C08G 69/42* | (2006.01) |
| *C08G 69/44* | (2006.01) |
| *C08G 69/40* | (2006.01) |
| *C08G 18/08* | (2006.01) |
| *C08G 18/48* | (2006.01) |
| *C08G 18/44* | (2006.01) |
| *C08G 18/66* | (2006.01) |
| *C08G 18/32* | (2006.01) |
| *C08G 18/34* | (2006.01) |
| *C08G 18/22* | (2006.01) |
| *C08G 18/28* | (2006.01) |
| *C08G 18/50* | (2006.01) |
| *C08L 33/26* | (2006.01) |
| *H01M 4/04* | (2006.01) |
| *H01B 1/06* | (2006.01) |
| *H01M 6/18* | (2006.01) |

(52) U.S. Cl.
CPC ......... *C08G 18/28* (2013.01); *C08G 18/282* (2013.01); *C08G 18/2865* (2013.01); *C08G 18/3206* (2013.01); *C08G 18/348* (2013.01); *C08G 18/44* (2013.01); *C08G 18/4833* (2013.01); *C08G 18/5024* (2013.01); *C08G 18/6692* (2013.01); *C08G 69/26* (2013.01); *C08G 69/265* (2013.01); *C08G 69/40* (2013.01); *C08G 69/42* (2013.01); *C08G 69/44* (2013.01); *C08G 73/10* (2013.01); *C08G 73/105* (2013.01); *C08G 73/1007* (2013.01); *C08G 73/1042* (2013.01); *C08G 73/1082* (2013.01); *C08L 33/26* (2013.01); *H01M 4/13* (2013.01); *H01M 4/62* (2013.01); *H01M 4/622* (2013.01); *H01M 10/0562* (2013.01); *H01B 1/06* (2013.01); *H01M 4/0404* (2013.01); *H01M 6/18* (2013.01); *H01M 2220/20* (2013.01); *H01M 2300/0068* (2013.01)

(58) Field of Classification Search
CPC ............. C08F 290/06; C08G 18/0823; C08G 18/227; C08G 18/28; C08G 18/282; C08G 18/2865; C08G 18/32306; C08G 18/348; C08G 18/44; C08G 18/4833; C08G 18/5024; C08G 18/6692; C08G 69/265; C08G 69/40; C08G 69/42; C08G 69/44; C08G 73/10; C08G 73/1007; C08G 73/1042; C08G 73/105; C08G 73/1082; C08L 33/26

See application file for complete search history.

(56) References Cited

U.S. PATENT DOCUMENTS

| | | |
|---|---|---|
| 2002/0122985 A1 | 9/2002 | Sato et al. |
| 2005/0187369 A1 | 8/2005 | Lee et al. |
| 2006/0251956 A1 | 11/2006 | Kim et al. |
| 2006/0258831 A1 | 11/2006 | Barksby et al. |
| 2009/0054543 A1 | 2/2009 | Nozawa et al. |
| 2010/0047693 A1 | 2/2010 | Yang et al. |
| 2011/0045030 A1* | 2/2011 | Desai ............... C08G 18/69 525/379 |
| 2012/0177997 A1 | 7/2012 | Nakamoto et al. |
| 2013/0260241 A1 | 10/2013 | Sone et al. |
| 2014/0120427 A1 | 5/2014 | Suyama et al. |
| 2014/0127579 A1 | 5/2014 | Yoshida et al. |
| 2014/0227578 A1 | 8/2014 | Yoshida |
| 2015/0307752 A1* | 10/2015 | Park ............... C08G 18/664 429/94 |

FOREIGN PATENT DOCUMENTS

| | | |
|---|---|---|
| JP | 2008-59843 A | 3/2008 |
| JP | 2008-103284 A | 5/2008 |
| JP | 2009-176484 A | 8/2009 |
| JP | 2010-113820 A | 5/2010 |
| JP | 2010-186682 A | 8/2010 |
| JP | 2010-205449 A | 9/2010 |
| JP | 2011-54439 A | 3/2011 |
| JP | 2011-134675 A | 7/2011 |
| JP | 2011-173998 A | 9/2011 |
| JP | 2011-233422 A | 11/2011 |
| JP | 2012-186181 A | 9/2012 |
| JP | 2012-227107 A | 11/2012 |
| JP | 2013-8611 A | 1/2013 |
| JP | 2013-97906 A | 5/2013 |
| WO | 2010/089891 A1 | 8/2010 |
| WO | 2012/073678 A1 | 6/2012 |
| WO | 2012/173089 A1 | 12/2012 |
| WO | 2013/001623 A | 1/2013 |
| WO | 2013/065738 A1 | 5/2013 |

OTHER PUBLICATIONS

International Search Report for PCT/JP2014/075398 dated Dec. 22, 2014 [PCT/ISA/210].
Written Opinion for PCT/JP2014/075398 dated Dec. 22, 2014 [PCT/ISA/237].
Shobugawa et al. JP 2013-097906. May 20, 2013. English machine translation by EPO.

* cited by examiner

SOLID ELECTROLYTE COMPOSITION, BINDER FOR ALL-SOLID-STATE SECONDARY BATTERIES, AND ELECTRODE SHEET FOR BATTERIES AND ALL-SOLID-STATE SECONDARY BATTERY EACH USING SAID SOLID ELECTROLYTE

CROSS-REFERENCE TO RELATED APPLICATIONS

This application is a Rule 53(b) Continuation of U.S. application Ser. No. 15/079,846 filed Mar. 24, 2016, which is a Continuation of PCT International Application No. PCT/JP2014/075398 filed on Sep. 25, 2014, which claims priority under 35 U.S.C. § 119 (a) to Japanese Patent Application No. 2013-198786 filed in Japan on Sep. 25, 2013. The above-noted applications are hereby expressly incorporated by reference, in their entirety, into the present application.

BACKGROUND OF THE INVENTION

1. Field of the Invention

The present invention relates to a solid electrolyte composition, a binder for an all-solid-state secondary battery, and an electrode sheet for batteries, and an all-solid-state secondary battery each using the solid electrolyte composition.

2. Description of the Related Art

An electrolyte solution is used in a lithium-ion battery. There has been an attempt of an all-solid-state secondary battery in which all configuration materials are solid by substituting the electrolyte solution with a solid electrolyte. Above all, the greatest advantage of the technique of using an inorganic solid electrolyte is high safety. As a medium of the electrolyte solution, a combustible material such as a carbonate-based solvent is used for the electrolyte solution used in the lithium-ion secondary battery. Therefore, various safety measures are employed, but there is a concern that inconvenience may occur when a battery is overcharged, and an additional measurement is desired. An all-solid-state secondary battery formed of an inorganic compound that can cause an electrolyte to be incombustible is regarded as a solution thereof.

A second advantage of the all-solid-state secondary battery is that a high energy density is suitably achieved by stacking electrodes. Specifically, the all-solid-state secondary battery can be a battery having a structure in which electrodes and electrolytes are directly arranged side by side to be serialized. At this point, a metal package that seals battery cells and a copper wire or a bus bar that connects battery cells can be omitted, and thus an energy density of the battery can be greatly increased. In addition, it is advantageous that good compatibility with a positive electrode material in which a potential can be enhanced to a high level.

According to the respective advantages as described above, the development of the all-solid-state secondary battery as a next-generation lithium-ion secondary battery is energetically advanced (see NEDO: New Energy and Industrial Technology Development Organization, Fuel Cells•Hydrogen Technology Development Field, Electricity Storage Technology Development Section "NEDO Technology Development Roadmap of Battery for New Generation Vehicles 2008" (June 2009)). Meanwhile, the inorganic all-solid-state secondary battery has a disadvantage caused by the fact that the electrolyte thereof is a hard solid. For example, interface resistance between solid particles increases. In order to overcome this disadvantage, a method of sintering a solid electrolyte in a high temperature (JP2008-059843A), a method of using a jig for pressurizing a cell (JP2008-103284A), a method of covering the entire element with a resin and pressurizing the entire element (JP2000-106154A), a method of pressurizing and baking a green sheet including a solid electrolyte (JP2012-186181A), and the like are suggested.

SUMMARY OF THE INVENTION

According to the descriptions of JP2008-059843A, JP2008-103284A, JP2000-106154A, and JP2012-186181A, an increase of interface resistance is prevented by the means of "pressurization", and thus it is desirable that an increase of interface resistance is easily prevented without using physical external power or means.

In view of the above, an object of the invention is to provide a solid electrolyte composition that can prevent an increase of interface resistance between solid particles and between solid particles and a collector, without pressurization, and that can realize satisfactory binding properties in the all-solid-state secondary battery, a binder for an all-solid-state secondary battery, and an electrode sheet for batteries, and an all-solid-state secondary battery each using the solid electrolyte composition.

In view of the objects described above, the present inventors have repeatedly performed studies and examinations on a material for forming a solid electrolyte layer in various aspects. As a result, the present inventors have found that if a high polymer binder formed of a polymer having a hard segment and a soft segment in a molecule is used, an increase of an interface resistance relating to the solid electrolyte layer is prevented. The invention is completed by this knowledge, and has following means.

[1] A solid electrolyte composition including: an inorganic solid electrolyte having conductivity of an ion of metal belong to Group 1 or 2 in the periodic table; and a high polymer binder, in which the high polymer binder is formed of a polymer having a hard segment and a soft segment.

[2] The solid electrolyte composition according to [1], in which the hard segment forming the high polymer binder contains at least any one bond of an amide bond, an urea bond, an urethane bond, and an imide bond.

[3] The solid electrolyte composition according to [1] or [2], in which the soft segment forming the high polymer binder contains at least any one of a polyalkylene oxide chain, a polycarbonate chain, a polyester chain, and a silicone chain.

[4] The solid electrolyte composition according to any one of [1] to [3], in which the polymer forming the high polymer binder includes at least any one of an alcoholic hydroxyl group, a phenolic hydroxyl group, a mercapto group, a carboxy group, a sulfo group, a sulfonamide group, a phosphate group, a cyano group, an amino group, a zwitterion-containing group, a metal hydroxide group, and a metal alkoxide group.

[5] The solid electrolyte composition according to any one of [1] to [4], in which the polymer forming the high polymer binder includes a carbon-carbon unsaturated group.

[6] The solid electrolyte composition according to [5], in which the carbon-carbon unsaturated group is expressed by Formula (1) or (2) below,

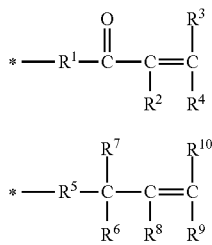

Formula (1)

Formula (2)

in Formulae (1) and (2), each of $R^1$ and $R^5$ independently represents an oxygen atom or $NR^N$, $R^N$ represents a hydrogen atom or an alkyl group, each of $R^2$ to $R^4$ and $R^6$ to $R^{10}$ independently represents a hydrogen atom or an alkyl group, and * represents a bonding position.

[7] The solid electrolyte composition according to any one of [1] to [6], in which the polymer forming the high polymer binder has at least any one of repeating structures expressed by Formulae (I-1) to (I-5) of Group I below, as the hard segment, <Group I>

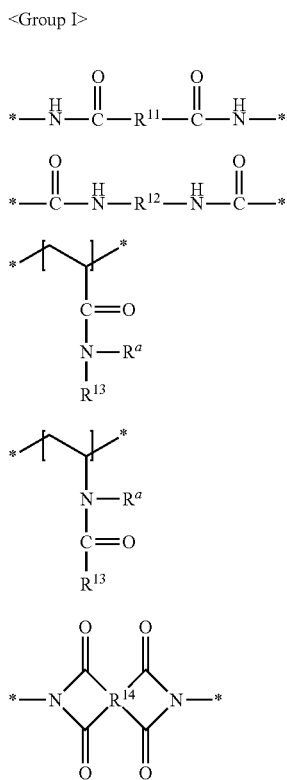

Formula (I-1)

Formula (I-2)

Formula (I-3)

Formula (I-4)

Formula (I-5)

in Formulae (I-1) to (I-5), each of $R^{11}$ and $R^{12}$ independently represents a bivalent linking group which is an alkylene group, an arylene group, or a combination thereof, $R^{13}$ represents an alkyl group, an alkenyl group, an aryl group, or an aralkyl group, $R^{14}$ represents an aromatic or aliphatic tetravalent linking group, $R^a$ represents a hydrogen atom or an alkyl group, and * represents a bonding position.

[8] The solid electrolyte composition according to any one of [1] to [6], in which the polymer forming the high polymer binder has at least any one of repeating structures expressed by Formulae (II-1) to (II-5) of Group II below, as the soft segment, <Group II>

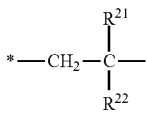

Formula (II-1)

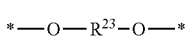

Formula (II-2)

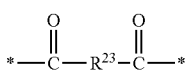

Formula (II-3)

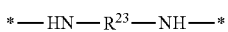

Formula (II-4)

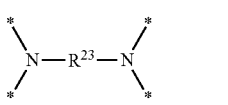

Formula (II-5)

in Formulae (II-1) to (II-5), $R^{21}$ represents a hydrogen atom or an alkyl group, $R^{22}$ represents a substituent group which contains a polyalkylene oxide chain, a polycarbonate chain, or a polyester chain and of which a weight average molecular weight is 200 to 200,000, $R^{23}$ represents a linking group which contains a polyalkylene oxide chain, a polycarbonate chain, or a polyester chain and of which a weight average molecular weight is 200 to 200,000, and * represents a bonding position.

[9] The solid electrolyte composition according to any one of [1] to [6], in which the polymer forming the high polymer binder has a repeating structure expressed by Formula (3) below, Formula (3)

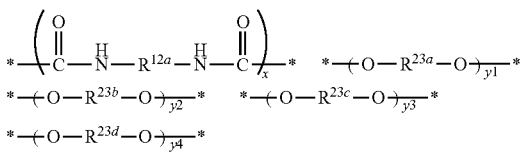
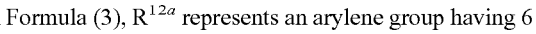
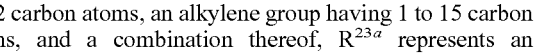

in Formula (3), $R^{12a}$ represents an arylene group having 6 to 22 carbon atoms, an alkylene group having 1 to 15 carbon atoms, and a combination thereof, $R^{23a}$ represents an alkylene group having 2 to 6 carbon atoms, $R^{23b}$ represents an alkylene group having an acidic group of which an acid dissociation constant pKa is 14 or less or a basic group in which a pKa of a conjugate acid is 14 or less, $R^{23c}$ represents an alkylene group having a radical or cationic polymerizable group, $R^{23d}$ represents a diol residue having a molecular weight of 500 to 10,000 and a glass-transition temperature of $-100°$ C. to $50°$ C., x represents 40 mol % to 60 mol %, $y^1$ represents 0 mol % to 40 mol %, $y^2$ represents 1 mol % to 20 mol %, $y^3$ represents 1 mol % to 40 mol %, $y^4$ represents 1 mol % to 40 mol %, $x+y^1+y^2+y^3+y^4$ is 100 mol %, and * represents a bonding position.

[10] The solid electrolyte composition according to any one of [1] to [9], further including: an electrode active substance.

[11] The solid electrolyte composition according to any one of [1] to [10], a ratio of a total mass of the inorganic solid electrolyte and an electrode active substance contained if necessary is in a range of 1,000 to 1 with respect to a mass of the high polymer binder.

[12] The solid electrolyte composition according to any one of [1] to [11], in which a molar ratio of the soft segment component to the hard segment component forming the high polymer binder is 1 to 10,000 mol with respect to 100 mol of the hard segment component.

[13] An electrode sheet for batteries obtained by forming a film by disposing the solid electrolyte composition according to any one of [1] to [12] on a metal foil.

[14] An all-solid-state secondary battery including: a positive electrode active substance layer; a negative active substance layer; and a solid electrolyte layer, in which at least any one of the positive electrode active substance layer, the negative active substance layer, and the solid electrolyte layer is formed of the solid electrolyte composition according to any one of [1] to [12].

[15] A binder for all-solid-state secondary batteries formed of a polymer having a repeating structure expressed by Formula (3) below,

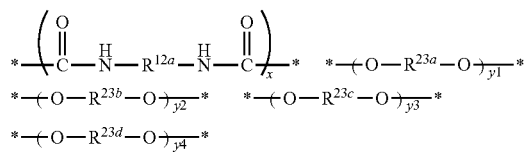

Formula (3)

in Formula (3), $R^{12a}$ represents an arylene group having 6 to 22 carbon atoms, an alkylene group having 1 to 15 carbon atoms, and a combination thereof, $R^{23a}$ represents an alkylene group having 2 to 6 carbon atoms, $R^{23b}$ represents an alkylene group having an acidic group of which an acid dissociation constant pKa is 14 or less or a basic group in which a pKa of a conjugate acid is 14 or less, $R^{23c}$ represents an alkylene group having a radical or cationic polymerizable group, $R^{23d}$ represents a diol residue having a molecular weight of 500 to 10,000, and a glass-transition temperature of $-100°$ C. to $50°$ C., x represents 40 mol % to 60 mol %, $y^1$ represents 0 mol % to 40 mol %, $y^2$ represents 1 mol % to 20 mol %, $y^3$ represents 1 mol % to 40 mol %, $y^4$ represents 1 mol % to 40 mol %, $x+y^1+y^2+y^3+y^4$ is 100 mol %, and * represents a bonding position.

In this specification, when there are plural substituents or linking groups indicated with specific reference symbols, or plural substituents or the like (in the same manner as in the definition of the number of substituents) are simultaneously or alternatively defined, the respective substituents may be identical to or different from each other. In addition, when the plural substituents and the like come close to each other, those may be bonded or condensed to each other to form a ring.

When the solid electrolyte composition according to the invention is used as a solid electrolyte layer of an all-solid-state secondary battery or a material of an active substance layer, the solid electrolyte composition exhibits an excellent effect in the all-solid-state secondary battery in that an increase of interface resistance between solid particles and between solid particles and a collector can be prevented without pressurization and satisfactory binding properties can be realized.

In this manner, according to the invention, it is possible to provide a solid electrolyte composition that can prevent an increase of interface resistance between solid particles and between solid particles and a collector, without pressurization, and that can realize satisfactory binding properties in the all-solid-state secondary battery, a binder for all-solid-state secondary batteries, and an electrode sheet for batteries and an all-solid-state secondary battery each using the solid electrolyte composition.

The aforementioned and other characteristics and advantages according to the invention are specifically described appropriately with reference to the accompanied drawings.

DESCRIPTION OF THE PREFERRED EMBODIMENTS

The solid electrolyte composition according to the invention includes an electrolyte and a high polymer binder formed of a polymer formed of a hard segment and a soft segment. Hereinafter, a preferred embodiment of the solid electrolyte composition is described. Also, an example of the all-solid-state secondary battery which is a preferred application form is described first.

Figure 1:
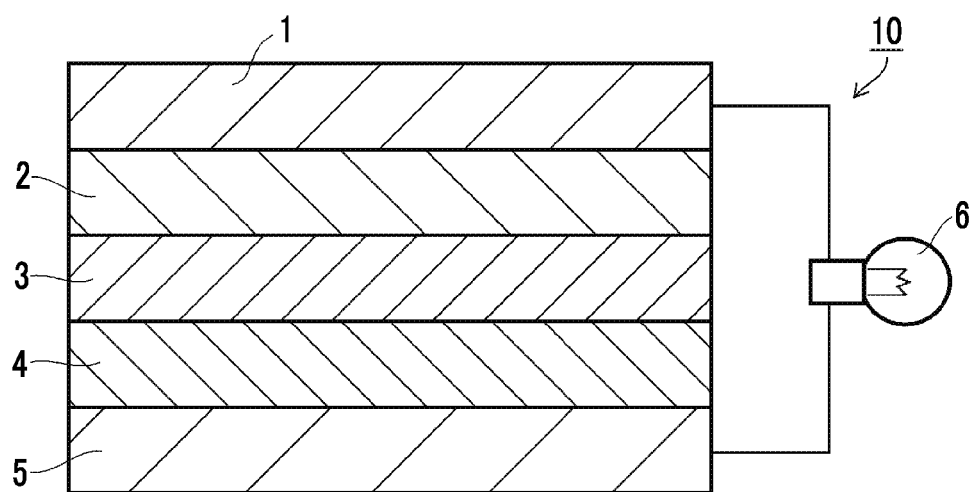
FIG. 1 is a sectional view schematically illustrating an all-solid-state lithium-ion secondary battery according to a preferred embodiment of the invention.

FIG. 1 is a sectional view schematically illustrating an all-solid-state secondary battery (lithium-ion secondary battery) according to a preferred embodiment of the invention. An all-solid-state secondary battery 10 according to the embodiment includes a negative electrode collector 1, a negative electrode active substance layer 2, a solid electrolyte layer 3, a positive electrode active substance layer 4, and a positive electrode collector 5, in this sequence, from the negative electrode side. The respective layers are in contact with each other, and form a stacked structure. If this structure is applied, when the battery is charged, electrons (e⁻) are supplied to a negative electrode side and lithium-ions (Li⁺) are accumulated thereto. Meanwhile, when the battery is discharged, the lithium-ions (Li⁺) accumulated in the negative electrode are returned to the positive electrode side, and electrons are supplied to an operating position 6. In the illustrated example, a bulb is employed in the operating position 6, and the bulb is turned on by the discharge. The solid electrolyte composition according to the invention is preferably used as a molding material of the negative electrode active substance layer, the positive electrode active substance layer, and the solid electrolyte layer. Among them, the solid electrolyte composition according to the invention is preferably used for molding the solid electrolyte layer.

Thicknesses of the positive electrode active substance layer 4, the solid electrolyte layer 3, and the negative electrode active substance layer 2 are not particularly limited, and also, if dimensions of the general batteries are considered, the thickness thereof is preferably 10 μm to 1,000 μm and more preferably 3 μm to 400 μm.

<Solid Electrolyte Composition>

(Inorganic Solid Electrolyte (A))

An inorganic solid electrolyte (A) according to the invention refers to a solid electrolyte made of inorganic compound. In this specification, the solid electrolyte is a solid-state electrolyte that can cause ions to move inside thereof. In this point of view, in order to differentiate the inorganic solid electrolyte with an electrolyte salt (supporting electrolyte) described below, the inorganic solid electrolyte (A) may be referred to as an ion conductive inorganic solid electrolyte.

An ion conductance of the inorganic solid electrolyte (A) is not particularly limited. In addition, in the lithium ion, the ion conductance is preferably $1\times10^{-6}$ S/cm or greater, more preferably $1\times10^{-5}$ S/cm or greater, still more preferably $1\times10^{-4}$ S/cm or greater, and particularly preferably $1\times10^{-3}$ S/cm or greater. The upper limit thereof is not particularly limited. In addition, the ion conductance is practically 1 S/cm or less.

The method of measuring the ion conductance is performed under the nonpressurization condition measured in the following example, unless described otherwise.

The inorganic solid electrolyte (A) is clearly differentiated from an organic solid electrolyte, a polymer electrolyte represented by polyethylene oxide (PEO) or the like, and an organic electrolyte salt represented by lithium bistrifluoromethane sulfone imide (LiTFSI), since the inorganic solid electrolyte (A) does not include a polymer compound or an organic compound such as a complex salt. In addition, since the inorganic solid electrolyte (A) is a non-dissociative solid in a normal state, the inorganic solid electrolyte (A) is not dissociated or isolated into cations or anions. In this point of view, the inorganic solid electrolyte is clearly differenciated from an inorganic electrolyte salt [$LiPF_6$, $LiBF_4$, lithium bis(fluorosulfonyl)imide [LiFSI], LiCl, and the like] which is dissociated or isolated into cations or anions in an electrolyte solution or a polymer. It is general that the inorganic solid electrolyte (A) includes metal belonging to Group 1 or 2 in the periodic table, has conductivity of an ion (preferably a lithium ion) of this metal, and does not have electron conductivity.

The inorganic solid electrolyte (A) is contained in at least any one layer of the positive electrode active substance layer, the inorganic solid electrolyte layer, and the negative active substance layer. As the contained inorganic solid electrolyte (A), a solid electrolyte material which is applied to the all-solid-state secondary battery can be appropriately selected to be used. Representative examples of the inorganic solid electrolyte (A) include (i) a sulfide-based inorganic solid electrolyte and (ii) an oxide-based inorganic solid electrolyte.

(i) Sulfide-Based Inorganic Solid Electrolyte

It is preferable that a sulfide-based inorganic solid electrolyte (hereinafter, simply referred to as "sulfide-based solid electrolyte") contains sulfur (S), includes metal belonging to Group 1 or 2 in the periodic table, has ion conductivity, and has electron insulation properties. Examples thereof include a lithium-ion conductive inorganic solid electrolyte satisfying the composition presented in Formula (7) below.

$$Li_aM_bP_cS_d \qquad \text{Formula (7)}$$

In Formula (7), M represents an element selected from B, Zn, Si, Cu, Ga, and Ge. a to d represent composition ratios of respective elements, and a:b:c:d satisfies 1 to 12:0 to 0.2:1:2 to 9.

In Formula (7), with respect to the composition ratios of Li, M, P, and S, it is preferable that b is 0, it is more preferable that b is 0, and a ratio of a, c, and d satisfies a:c:d=1 to 9:1:3 to 7, and it is still more preferable that b is 0 and a:c:d=1.5 to 4:1:3.25 to 4.5. The composition ratio of the respective elements can be controlled by adjusting a blending amount of raw material compounds when a sulphide-based solid electrolyte is manufactured, as described below.

The sulphide-based solid electrolyte may be amorphous (glass) or may be crystallized (formed into glass ceramic), or a portion thereof may be crystallized.

In Li—P—S-based glass and Li—P—S-based glass ceramics, the ratio of $Li_2S$ and $P_2S_5$ is preferably 65:35 to 85:15 and more preferably 68:32 to 75:25 in the molar ratio of $Li_2S$:$P_2S_5$. If the ratio of $Li_2S$ and $P_2S_5$ is in the range described above, lithium-ion conductance can be increased. Specifically, the lithium-ion conductance can be preferably $1\times10^{-4}$ S/cm or higher and more preferably $1\times10^{-3}$ S/cm or higher.

Examples of this compound include a compound obtained by using $Li_2S$ and a material composition containing sulfide of an element of Groups 13 to 15.

Specific examples thereof include $Li_2S$—$P_2S_5$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Among these, a crystalline and/or amorphous material composition formed of $Li_2S$—$P_2S_5$, $Li_2S$—$GeS_2$—$Ga_2S_3$, $Li_2S$—$GeS_2$—$P_2S_5$, $Li_2S$—$SiS_2$—$P_2S_5$, $Li_2S$—$SiS_2$—$Li_4SiO_4$, and $Li_2S$—$SiS_2$—$Li_3PO_4$ is preferable, since the crystalline and/or amorphous raw material composition has high lithium-ion conductivity.

Examples of the method of synthesizing a sulfide-based solid electrolyte by using such a raw material composition include an amorphizing method. Examples of the amorphizing method include a mechanical milling method and a melt quenching method, and among these, a mechanical milling method is preferable, because a treatment in room temperature becomes possible, and thus the simplification of the manufacturing step is achieved.

(ii) Oxide-Based Inorganic Solid Electrolyte

It is preferable that the oxide-based inorganic solid electrolyte (hereinafter, simply referred to as an oxide-based solid electrolyte) contains oxygen (O), includes metal belonging to Group 1 or 2 in the periodic table, has ion-conductivity, and has electron insulation properties.

Specific examples of the compound include $Li_{xa}La_{ya}TiO_3$ [xa=0.3 to 0.7, ya=0.3 to 0.7] (LLT), $Li_7La_3Zr_2O_{12}$ (LLZ), $Li_{3.5}Zn_{0.25}GeO_4$ having a lithium super ionic conductor (LISICON)-type crystal structure, $LiTi_2P_3O_{12}$ having a natrium super ionic conductor (NASICON)-type crystal structure,  $Li_{1+xb+yb}(Al, Ga)_{xb}(Ti,Ge)_{2-xb}Si_{yb}P_{3-yb}O_{12}$ (however, 0≤xb≤1, 0≤yb≤1), and $Li_7La_3Zr_2O_{12}$ having a garnet-type crystal structure.

In addition, a phosphorous compound including Li, P, and O is also preferable. Examples thereof include lithium phosphate ($Li_3PO_4$) and LiPON and LiPOD in which a portion of oxygen of lithium phosphate is substituted with nitrogen (D is at least any one selected from Ti, V, Cr, Mn, Fe, Co, Ni, Cu, Zr, Nb, Mo, Ru, Ag, Ta, W, Pt, and Au). In addition, LiAON (A is at least any one selected from Si, B, Ge, Al, C, and Ga) can be preferably used.

Among these, $Li_{1+xb+yb}(Al,Ga)_{xb}(Ti,Ge)_{2-xb}Si_{yb}P_{3-yb}O_{12}$ (however, 0≤xb≤1, 0≤yb≤1) is preferable, since $Li_{1+xb+yb}(Al,Ga)_{xb}(Ti,Ge)_{2-xb}Si_{yb}P_{3-yb}O_{12}$ has high lithium-ions conductivity and are chemically stable, are easily managed. These may be used singly or two or more types thereof may be used in combination.

The lithium-ion conductance of the oxide-based solid electrolyte is preferably $1\times10^{-6}$ S/cm or greater, more preferably $1\times10^{-5}$ S/cm or greater, and still more preferably $5\times10^{-5}$ S/cm or greater.

It is preferable that the inorganic solid electrolyte (A) does not absorb moisture in view of decrease in the ion conductance due to hydrolysis or prevention of electrolysis of water at the time of energization. The sulfide-based inorganic solid electrolyte extremely easily reacts with moisture in the air and is easily decomposed to generate hydrogen sulfide. Since a high polymer binder (B) according to the invention has a hard segment and a soft segment in a molecule, the water resistance of the solid electrolyte can be improved. Therefore, if a sulfide-based inorganic solid electrolyte is used, decomposition due to water is effectively suppressed, such that the generation amount of the hydrogen sulfide can be decreased.

According to the invention, the oxide-based inorganic solid electrolyte is preferably used. The oxide-based inorganic solid electrolyte has high solidity in most cases, and thus an increase of the interface resistance is easily generated in the all-solid-state secondary battery. Since the high polymer binder (B) according to the invention has a hard segment and a soft segment in a molecule, an increase of the interface resistance is effectively prevented. Particularly, it is assumed that the oxide-based inorganic solid electrolyte and the high polymer binder (B) according to the invention react with each other, so as to form a more suitable adsorption state. In this point of view, it is particularly preferable to use an oxide-based inorganic solid electrolyte.

The inorganic solid electrolyte may be used singly or two or more types thereof may be used in combination.

An average particle size of an inorganic solid electrolyte is not particularly limited. In addition, the average particle size is preferably 0.001 μm or greater and more preferably 0.01 μm or greater. The upper limit preferably 1,000 μm or shorter and more preferably 100 μm or shorter.

If compatibility between the battery performance and the decrease•maintenance of the interface resistance is considered, the concentration in the solid electrolyte composition of the inorganic solid electrolyte (A) is preferably 50 mass % or greater, more preferably 80 mass % or greater, and still more preferably 90 mass % or greater with respect to 100 mass % of the solid component. In the same point of view, the upper limit is preferably 99.9 mass % or lower, more preferably 99 mass % or lower, and still more preferably 98 mass % or lower.

(High Polymer Binder (B))

The high polymer binder (B) used in the invention preferably contains the hard segment and the soft segment in a predetermined ratio. The hard segment can be described as a segment that has a rigid group such as an aromatic group, a heteroaromatic group, and an aliphatic alicyclic group and a bond portion enabling intermolecular packing due to a hydrogen bond or π-π mutual interaction in a molecule, in a main chain and that generally has ridigity, strong cohesive power, and a fiber form. The hard segment refers to a segment of which a glass-transition temperature (Tg) of the compound made of this portion is high and is typically 100° C. or higher. The soft segment can be described as a segment that has a long-chain linear group or a long-chain branched group and that has soft and elasticity. The soft segment refers to a segment of which the glass-transition temperature thereof is low and is 50° C. or lower.

Hard Segment

The hard segment preferably has a skeleton that forms an intermolecular pseudo crosslink via a hydrogen bond. In addition, the hard segment more preferably contains at least any one bond of an amide bond, an urea bond, an urethane bond, and an imide bond. The hard segment is still more preferably a group selected from Group I below.

<Group I>

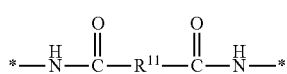

Formula (I-1)

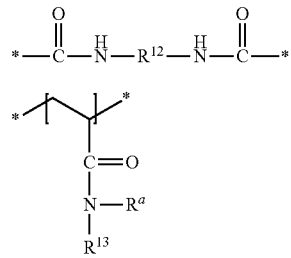

In addition, * represents a bonding position.

In Formulae (I-1) and (I-2), each of $R^{11}$ and $R^{12}$ independently represents an alkylene group (the number of carbon atoms is preferably 1 to 12, more preferably 1 to 6, and still more preferably 1 to 3), an arylene group (the number of carbon atoms is preferably 6 to 22, more preferably 6 to 14, and still more preferably 6 to 10), or a combination thereof. Preferably examples of the linking group of $R^{11}$ and $R^{12}$ include a group expressed by Formula (M2) or (M3) below. In addition, if groups expressed by Formula (I-1) and Formula (I-2) are linked to an oxygen atom or an imino group ($>NR^N$) to become an urethane group or an urea group.

In Formulae (I-3) and (I-4), $R^{13}$ represents an alkyl group (the number of carbon atoms is preferably 1 to 12, more preferably 1 to 6, and still more preferably 1 to 3), an alkenyl group (the number of carbon atoms is preferably 2 to 12, more preferably 2 to 6, and still more preferably 2 to 3), an aryl group (the number of carbon atoms is preferably 6 to 22, more preferably 6 to 14, and still more preferably 6 to 10), and an aralkyl group (the number of carbon atoms is preferably 7 to 23, more preferably 7 to 15, and still more preferably 7 to 11). $R^a$ represents a hydrogen atom or an alkyl group (the number of carbon atoms is preferably 1 to 12, more preferably 1 to 6, and still more preferably 1 to 3).

In addition, an arbitrary substituent group (a methyl group, an ethyl group, a propyl group, a halogen atom, a hydroxy group, and the like) is substituted with an ethylene group of the main chain in Formula (I-3). Here, $R^{13}$ may form a ring, and $R^{13}$ may be bonded to $R^a$ in Formula (I-4), so as to form, for example, a pyrrolidone ring or an ε-caprolactam ring substituted at an N position.

In addition, in Formulae (I-3) and (I-4), the ethylene group of the main chain may have a substituent group. Examples of the substituent group include a methyl group, an ethyl group, a halogen atom, and a cyano group. In addition, an arbitrary linking group may be interposed between the ethylene group of the main chain and a CO group or an NH group of the substituent group.

In Formula (I-5), $R^{14}$ represents an aromatic or aliphatic tetravalent linking group. $R^{14}$ is preferably a linking group expressed by any one of Formulae (i) to (iix) below.

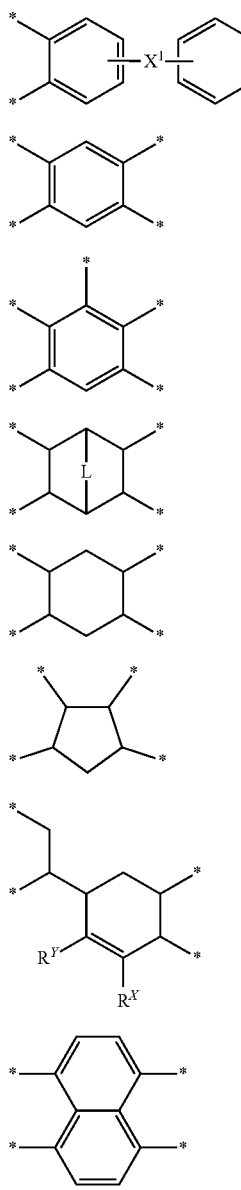

In Formulae (i) to (iix), $X^1$ represents a single bond or a bivalent linking group. As the bivalent linking group, an alkylene group having 1 to 6 carbon atoms (for example, a methylene group, an ethylene group, and a propylene group) is preferable. As the propylene group, 1,3-hexafluoro-2,2-propanediyl group is preferable. L represents —CH₂=CH₂— or —CH₂—. Each of $R^X$ and $R^Y$ independently represents a hydrogen atom or a substituent group. * represents a bonding position to a carbonyl group.

The substituent group in $R^X$ and $R^Y$ represents an alkyl group (the number of carbon atoms is preferably 1 to 12, more preferably 1 to 6, an still more preferably 1 to 3) or an aryl group (the number of carbon atoms is preferably 6 to 22, more preferably 6 to 14, and still more preferably 6 to 10).

Soft Segment

The soft segment preferably contains at least any one of a polyalkylene oxide chain (a polyethylene oxide chain or a polypropylene oxide chain is preferable), a polycarbonate chain, a polyester chain, and a silicone chain. The soft segment is more preferably a group selected from Group II below.

<Group II>

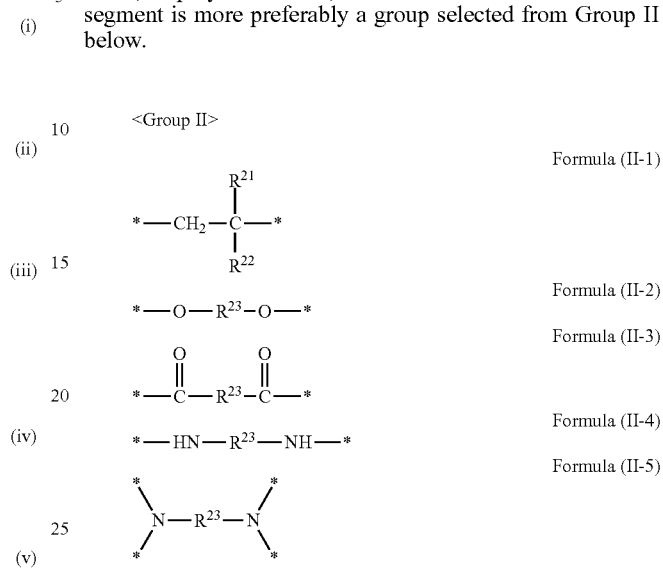

In addition, * represents a bonding position.

In Formulae (II-1) to (II-5), $R^{21}$ represents a hydrogen atom or an alkyl group (the number of carbon atoms is preferably 1 to 12, more preferably 1 to 6, and still more preferably 1 to 3).

$R^{22}$ represents a polyalkylene oxide chain (a polyethylene oxide chain and a polypropylene oxide chain are preferable), or a substituent group which contains a polycarbonate chain or a polyester chain and of which the weight average molecular weight is 200 to 200,000. The weight average molecular weight is preferably 500 or greater, more preferably 700 or greater, still more preferably 1,000 or greater. The upper limit is preferably 100,000 or lower and more preferably 10,000 or lower.

$R^{22}$ preferably has an alkyl group at a terminal (the number of carbon atoms is preferably 1 to 12 and more preferably 1 to 6). In addition, an ether group (—O—), a thioether group (—S—), a carbonyl group (>C=O), and an imino group (>NR$^N$) may be included in the alkyl group. In addition, $R^{22}$ may include a hetero atom-containing group or a carbon-carbon unsaturated group defined as a third component described below.

$R^{23}$ represents a linking group which contains a polyalkylene oxide chain (a polyethylene oxide chain or a polypropylene oxide chain is preferable), a polycarbonate chain, or a polyester chain and of which a weight average molecular weight is 200 to 200,000. The weight average molecular weight is preferably 500 or greater, more preferably 700 or greater, and still more preferably 1,000 or greater. The upper limit is preferably 100,000 or lower and more preferably 10,000 or lower.

$R^{23}$ preferably has an alkyl group (the number of carbon atoms is preferably 1 to 12 and more preferably 1 to 6) at the terminal. In addition, an ether group (—O—), a thioether group (—S—), carbonyl group (>C=O), and an imino group (>NR$^N$) in an alkyl group. In addition, $R^{23}$ may have a hetero atom-containing group or a carbon-carbon unsaturated group defined as a third component described below.

In addition, the weight average molecular weights of $R^{22}$ and $R^{23}$ can be obtained as the weight average molecular weight in terms of polystyrene in the GPC with respect to the monomer before being combined with the polymer.

With respect to the ratio of the hard segment component and the soft segment component of the polymer forming the high polymer binder (B) according to the invention, the content of the hard segment component is preferably 50 mol % or greater, more preferably 60 mol % or greater, and still more preferably 70 mol % or greater in the total polymer. The upper limit thereof is preferably 99 mol % or lower, more preferably 90 mol % or lower, and still more preferably 80 mol % or lower.

The soft segment component is preferably 1 mol % or greater, more preferably 2 mol % or greater, and still more preferably 5 mol % or greater in the total polymer. The upper limit is preferably 50 mol % or lower, more preferably 30 mol % or lower, and still more preferably 20 mol % or lower.

The molar ratio of the soft segment component is preferably 1 mol % or greater, more preferably 10 mol % or greater, and still more preferably 50 mol % or greater with respect to 100 mol % of the hard segment component. The upper limit thereof is preferably 1,000 mol % or lower, more preferably 500 mol % or lower, and still more preferably 100 mol % or lower.

It is preferable to adjust respective segments in the range described above since a more excellent effect in a decrease or maintenance of the interface resistance in the all-solid-state secondary battery can be obtained.

Third Component

The high polymer binder (B) according to the invention preferably has a repeating unit having a hetero atom-containing group. The hetero atom-containing group preferably has at least any one of an alcoholic hydroxyl group (hydroxyalkyl group: of which the number of carbon atoms is preferably 1 to 6 and more preferably 1 to 3), a phenolic hydroxyl group (a hydroxyphenyl group), a mercapto group, a carboxy group, a sulfo group, a sulfonamide group, a phosphate group, a cyano group, an amino group, a zwitterion-containing group, a metal hydroxide group, and a metal alkoxide group. Here, the amino group is represented by —$NR^N_2$, and $R^N$ has the same meaning as $R^N$ of an imino group (>$NR^N$) described below and also has the same preferable scope. Specifically, the zwitterion-containing group has a betaine structure (the number of carbon atoms is preferably 1 to 12 and more preferably 1 to 6), examples of the cation portion thereof includes quaternary ammonium, sulfonium, and phosphonium, and examples of the anion portion thereof include carboxylate and sulfonate. Specifically, metal hydroxide is a hydroxy silyl group and a hydroxyl titanyl group. Specifically, as metal alkoxide, an alkoxysilyl group (the number of carbon atoms is preferably 1 to 12 and more preferably 1 to 6) and an alkoxy titanyl group (the number of carbon atoms is preferably 1 to 12 and more preferably 1 to 6) are preferable, and more specifically, metal alkoxide is a trimethoxysilyl group, a methyldimethoxysilyl group, a triethoxysilyl group, a methyldiethoxysilyl group, and a trimethoxy titanyl group.

In the specification, in the polymer forming the high polymer binder (B), the content of the repeating unit including the hetero atom-containing group is preferably 0 mol % to 30 mol % in the total polymer. It is preferable that the repeating unit having the hetero atom-containing group is incorporated with the polymer forming the high polymer binder, since conductivity of a lithium ion is increased, a mutual interaction with an inorganic solid electrolyte is generated, and adhesiveness.

In addition, it is preferable that the high polymer binder (B) according to the invention has a carbon-carbon unsaturated group as the third component. As the carbon-carbon unsaturated group, a carbon-carbon double bond or a carbon-carbon triple bond is included. Specifically, as the group including a carbon-carbon double bond, an acrylic group, a methacryl group, a vinyl group, an allyl group, and a maleimide group are included. Specifically, as the carbon-carbon triple bond, a terminal ethynyl group, an internal ethynyl group, a propargyl group, and the like are included.

In this specification, the group having the carbon-carbon unsaturated group is more preferably the group expressed by Formula (1) or (2) below.

Formula (1)

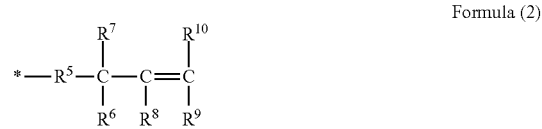

Formula (2)

In addition, * represents a bonding position.

In Formulae (1) and (2), each of $R^1$ and $R^5$ independently represents an oxygen atom or an imino group (>$NR^N$). $R^N$ represents a hydrogen atom or an alkyl group (the number of carbon atoms is preferably 1 to 12, more preferably 1 to 6, and still more preferably 1 to 3). Each of $R^2$ to $R^4$, $R^6$ to $R^{10}$ independently represents a hydrogen atom or an alkyl group (the number of carbon atoms is preferably 1 to 12, more preferably 1 to 6, and still more preferably 1 to 3).

In this specification, the repeating unit having a carbon-carbon unsaturated group is preferably 0 mol % to 30 mol % in the total polymer. It is preferable that the repeating unit having a carbon-carbon unsaturated group is combined with the polymer forming the high polymer binder (B), since an effect in that a chemical bond with the inorganic solid electrolyte is generated and adhesiveness is enhanced can be expected.

The third component may exist in any one of the hard segment portion and the soft segment portion in a polymer chain forming the binder. In addition, the third component may exist in a side chain of the polymer or may exist in a terminal of a main chain of the polymer.

Hereinafter, the polymer forming the high polymer binder (B) that can be used in the invention is described.

The polymer according to the invention has a hard segment and a soft segment. Hereinafter, the hard segment component is mainly described in particular.

Polymer Having Amide Bond

Examples of the polymer having an amide bond include polyamide and polyacrylamide.

Polyamide can be obtained by polycondensing diamine and a dicarboxylic acid or by random ring opening polymerization.

Examples of the diamine component include aliphatic diamines such as ethylenediamine, 1-methylethyl diamine, 1,3-propylene diamine, tetramethylenediamine, pentamethylenediamine, heptamethylenediamine, octamethylenediamine, nonamethylene diamine, decamethylene diamine, undecamethylene diamine, and dodecamethylenediamine. Also, examples thereof include cyclohexane diamine, bis(4, 4'-aminohexyl) methane, and paraxylylenediamine. As diamine having the polypropyleneoxy chain, JEFFAMINE (manufactured by Huntsman International LLC.) can be used.

Examples of the carboxylic acid component include aliphatic dicarboxylic acids such as a malonic acid, a succinic acid, a glutaric acid, a sebacic acid, a pimelic acid, a suberic acid, an azelaic acid, an undecanoic acid, an undecadioic acid, a dodecadioic acid, and a dimer acid, a 1,4-cyclohexane dicarboxylic acid, a paraxylylene dicarboxylic acid, a metaxylylene dicarboxylic acid, a phthalic acid, a 2,6-naphthalene dicarboxylic acid, and a 4,4'-diphenyl dicarboxylic acid.

The diamine portion may be the soft segment or the dicarboxylic acid portion may be the soft segment.

Polyacrylamide can be obtained by radically polymerizing an acrylamide monomer. If polyacrylamide is copolymerized with the acrylamide monomer, polyacrylamide can be copolymerized with an arbitrary radical monomer. Examples of the copolymerization method include random polymerization, graft polymerization, and block polymerization. In addition, as the hard segment, block polymerization is more preferably in order to construct polyacrylamide.

The acrylamide monomer can be synthesized with primary amine and acrylic acid chloride or primary amine and acrylic anhydride. Examples thereof include methylacrylamide, ethylacrylamide, butylacrylamide, 2-ethylhexyl acrylamide, benzylacrylamide, cyclohexyl acrylamide, and 1-adamantane acrylamide.

The monomer that can be copolymerized with the acrylamide monomer preferably functions as the soft segment, and examples thereof include a radical polymerizable oligomer having a polyethylene oxide chain, a polypropylene oxide chain, a polycarbonate chain, a polyester chain, and a silicone chain. For example, polyethylene glycol monomethyl ether acrylamide, polyethylene glycol monomethyl ether acrylate, polyethylene glycol monomethyl ether methacrylate, polypropylene glycol monomethyl ether methacrylate, polyester methacrylate, polycarbonate methacrylate, and methacrylate-modified silicone oil are suitably used.

The introduction of the soft segment of the amide polymer can be performed, for example, by polycondensing a long-chain alkyl group that may be separated by a hetero atom, for example, terminal diamine having an ethylene oxide chain or a propylene oxide chain with a dicarboxylic acid. As the soft segment-containing diamine, for example, "JEFFAMINE" series (manufactured by Huntsman International LLC. and Mitsui Fine Chemicals, Inc.) can be used as commercially available products.

Polymer Having Urea Bond

Examples of the polymer having a urea bond include polyurea. Polyurea can be synthesized by polycondensing a diisocyanate compound and a diamine compound in presence of an amine catalyst. Examples of diisocyanate include compounds described below.

Diisocyanate Compound

The diisocyanate compound is not particularly limited and appropriately selected, and examples thereof include compounds expressed by Formula (M1) below.

OCN—$R^{M1}$—NCO (M1)

However, in Formula (M1), $R^{M1}$ represents bivalent aliphatic or aromatic hydrocarbon that may have a substituent group (for example, an alkyl group, an aralkyl group, an aryl group, an alkoxy group, or a halogen atom is preferable). If necessary, $R^{M1}$ may have another functional group that does not react with an isocyanate group, for example, any one of an ester group (a group having an ester bond, such as an acyloxy group, an alkoxycarbonyl group, or an aryloxycarbonyl group), an urethane group, an amide group, and an ureido group.

The diisocyanate compound expressed by Formula (M1) is not particularly limited, and examples thereof include diisocyanate, a triisocyanate compound (compounds disclosed in paragraphs 0034 to 0035 of JP2005-250438A), and a product obtained by adding and reacting 1 equivalent of monofunctional alcohol having an ethylenically unsaturated group or a monofunctional amine compound (compounds disclosed in paragraphs 0037 to 0040 of JP2005-250438A).

The diisocyanate compound expressed by Formula (M1) is not particularly limited and can be appropriately selected, according to the purposes. In addition, it is preferable that the diisocyanate compound preferably includes a group expressed by Formula (M2) below.

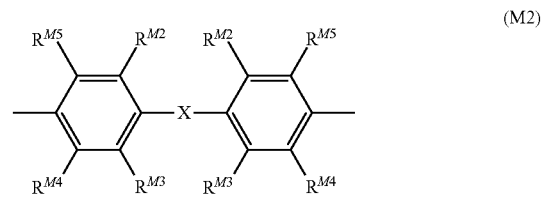

In Formula (M2), X represents a single bond, —$CH_2$—, —$C(CH_3)_2$—, —$SO_2$—, —S—, —CO—, or —O—. In view of binding properties, —$CH_2$— or —O— is preferable, and —$CH_2$— is more preferable. The alkylene group exemplified herein may be substituted with a halogen atom (preferably a fluorine atom).

Each of $R^{M2}$ to $R^{M5}$ independently represents a hydrogen atom, a univalent organic group, a halogen atom, —$OR^{M6}$, —$N(R^{M6})_2$, or —$SR^{M6}$. $R^{M6}$ represents a hydrogen atom or a univalent organic group.

Examples of the univalent organic group include an alkyl group having 1 to 20 carbon atoms, an alkenyl group having 1 to 20 carbon atoms, —$OR^{M7}$ [however, $R^{M7}$ represents a univalent organic group (preferably an alkyl group having 1 to 20 carbon atoms, an aryl group having 6 to 10 carbon atoms, and the like)], an alkylamino group (the number of carbon atoms is preferably 1 to 20 and more preferably 1 to 6), and an arylamino group (the number of carbon atoms is preferably 6 to 40 and more preferably 6 to 20).

$R^{M2}$ to $R^{M5}$ are preferably a hydrogen atom, an alkyl group having 1 to 20 carbon atoms, or —$OR^{M7}$, more preferably a hydrogen atom or an alkyl group having 1 to 20 carbon atoms, and still more preferably a hydrogen atom. Examples of the halogen atom include a fluorine atom, a chlorine atom, and a bromine atom.

It is more preferable that a group expressed by Formula (M3) below is included as the diisocyanate compound expressed by Formula (M1).

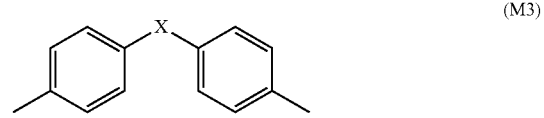

In Formula (M3), X has the same meaning as X of Formula (M2) and also has the same preferable range.

The composition ratio of the aromatic group expressed by Formulae (M1) to (M3) is preferably 10 mol % or greater, more preferably 10 mol % to 50 mol %, and still more preferably 30 mol % to 50 mol % in the polymer.

Specific examples of the diisocyanate compound expressed by Formula (M1) are not particularly limited and appropriately selected according to the purpose, and examples thereof include a dimer such as 2,4-tolylene diisocyanate and 2,4-tolylene diisocyanate, an aromatic diisocyanate compound such as 2,6-tolylene diisocyanate, p-xylylene diisocyanate, m-xylylene diisocyanate, 4,4'-diphenylmethane diisocyanate(MDI), 1,5-naphthylene diisocyanate, and 3,3'-dimethylbiphenyl-4,4'-diisocyanate; an aliphatic diisocyanate compound such as hexamethylene diisocyanate, trimethyl hexamethylene diisocyanate, lysine diisocyanate, and dimer aciddiisocyanate; an alicyclic diisocyanate compound such as isophorone diisocyanate, 4,4'-methylenebis(cyclohexyl isocyanate), methyl cyclohexane-2,4 (or 2,6) diisocyanate, and 1,3-(isocyanatomethyl) cyclohexane; and a diisocyanate compound which is a reactant of an adduct of 1 mol of 1,3-butylene glycol and 2 mols of tolylene diisocyanate with diol and diisocyanate. These may be used singly or two or more types thereof may be used in combination. Among these, 4,4'-diphenylmethane diisocyanate (MDI) is preferable.

The introduction of the soft segment of the polymer having a urea bond can be performed by polycondensing terminal diamine having a long-chain alkyl group (for example, an ethylene oxide chain and a propylene oxide chain) that may be separated by a hetero atom with isocyanate. As the soft segment-containing diamine is, for example, "JEFFAMINE" series (manufactured by Huntsman International LLC. and Mitsui Fine Chemicals, Inc.) can be used as commercially available products. Specific examples thereof include JEFFAMINE D-230, JEFFAMINE D-400, JEFFAMINE D-2000, JEFFAMINE XTJ-510, JEFFAMINE XTJ-500, JEFFAMINE XTJ-501, JEFFAMINE XTJ-502, JEFFAMINE HK-511, JEFFAMINE EDR-148, JEFFAMINE XTJ-512, JEFFAMINE XTJ-542, JEFFAMINE XTJ-533, and JEFFAMINE XTJ-536.

Polymer Having Imide Bond

Examples of the polymer having an imide bond include polyimide. Polyimide can be obtained by adding tetracarboxylic dianhydride and diamine to form a polyamic acid, and thereafter closing a ring.

Specific examples of tetracarboxylic dianhydride include 3,3',4,4'-biphenyltetracarboxylic dianhydride (s-BPDA) and pyromellitic dianhydride (PMDA). Also, specific examples thereof include 2,3,3',4'-biphenyltetracarboxylic dianhydride (a-BPDA), oxydiphthalic dianhydride, diphenyl sulfone-3,4,3',4'-tetracarboxylic dianhydride, bis(3,4-dicarboxyphenyl) sulfide dianhydride, 2,2-bis(3,4-dicarboxyphenyl)-1,1,1,3,3,3-hexafluoropropane dianhydride, 2,3,3',4'-benzophenone tetracarboxylic dianhydride, 3,3',4,4'-benzophenone tetracarboxylic dianhydride, bis(3,4-dicarboxyphenyl) methane dianhydride, 2,2-bis(3,4-dicarboxyphenyl) propane dianhydride, p-phenylene bis (trimellitic acid monoester acid anhydride), p-biphenylene bis(trimellitic acid monoester acid anhydride), m-terphenyl-3,4,3',4'-tetracarboxylic dianhydride, p-terphenyl-3,4,3',4'-tetracarboxylic dianhydride, 1,3-bis(3,4-dicarboxy phenoxy) benzene dianhydride, 1,4-bis(3,4-dicarboxy phenoxy) benzene dianhydride, 1,4-bis(3,4-dicarboxy phenoxy) biphenyl dianhydride, 2,2-bis[(3,4-dicarboxy phenoxy) phenyl] propane dianhydride, 2,3,6,7-naphthalene tetracarboxylic dianhydride, 1,4,5,8-naphthalene tetracarboxylic dianhydride, and 4,4'-(2,2-hexafluoroisopropylidene) diphthalic dianhydride. These may be used singly or two or more types thereof may be used in a mixture.

A tetracarboxylic acid component preferably includes at least s-BPDA and/or PMDA. For example, the content of s-BPDA is preferably 50 mol % or greater, more preferably 70 mol % or greater, and still more preferably 75 mol % or greater with respect to 100 mol % of the tetracarboxylic acid component. Since it is desirable that tetracarboxylic acid dihydrate functions as a hard segment, it is preferable that tetracarboxylic acid dihydrate has a rigid benzene ring.

Specific examples of diamine used in polyimide include
1) diamine having one benzene nucleus such as paraphenylenediamine (1,4-diaminobenzene; PPD), 1, 3-diaminobenzene, 2,4-toluenediamine, 2,5-toluenediamine, and 2,6-toluenediamine,
2) diaminodiphenyl ethers such as 4,4'-diaminodiphenyl ether, 3,3'-diaminodiphenyl ether, and 3,4'-diaminodiphenyl ether, diamine having 2 benzene nuclei such as 4,4'-diaminodiphenylmethane, 3,3'-dimethyl-4,4'-diamino biphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl) sulfide, 4,4'-diamino benzanilide, 3,3'-dichlorobenzidine, 3,3'-dimethyl benzidine, 2,2'-dimethyl-benzidine, 3,3'-dimethoxy benzidine, 2,2'-dimethoxy benzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diamino benzophenone, 3,3'-diamino-4,4'-dichlorobenzophenone, 3,3'-diamino-4,4'-dimethoxy benzophenone, 3,3'-diaminodiphenylmethane, 3,4'-diaminodiphenylmethane, 4,4'-diaminodiphenylmethane, 2,2-bis(3-aminophenyl) propane, 2,2-bis(4-aminophenyl) propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenyl sulfoxide, 3,4'-diaminodiphenyl sulfoxide, and 4,4'-diaminodiphenyl sulfoxide,
3) diamine having 3 benzene nuclei such as 1,3-bis(3-aminophenyl) benzene, 1,3-bis(4-aminophenyl) benzene, 1,4-bis(3-aminophenyl) benzene, 1,4-bis(4-aminophenyl) benzene, 1,3-bis(4-aminophenoxy) benzene, 1,4-bis(3-aminophenoxy) benzene, 1,4-bis(4-aminophenoxy) benzene, 1,3-bis(3-aminophenoxy)-4-trifluoromethyl benzene, 3,3'-diamino-4-(4-phenyl) phenoxy benzophenone, 3,3'-diamino-4,4'-di(4-phenylphenoxy) benzophenone, 1,3-bis(3-aminophenyl sulfide) benzene, 1,3-bis(4-aminophenyl sulfide) benzene, 1,4-bis(4-aminophenyl sulfide) benzene, 1,3-bis(3-aminophenyl sulfone) benzene, 1,3-bis(4-aminophenyl sulfone) benzene, 1,4-bis(4-aminophenyl sulfone) benzene, 1,3-bis[2-(4-aminophenyl) isopropyl] benzene, 1,4-bis[2-(3-aminophenyl) isopropyl] benzene, and 1,4-bis[2-(4-aminophenyl) isopropyl] benzene,
4) diamine having 4 benzene nuclei such as 3,3'-bis(3-aminophenoxy) biphenyl, 3,3'-bis(4-aminophenoxy) biphenyl, 4,4'-bis(3-aminophenoxy) biphenyl, 4,4'-bis(4-aminophenoxy) biphenyl, bis[3-(3-aminophenoxy) phenyl] ether, bis[3-(4-aminophenoxy) phenyl] ether, bis[4-(3-aminophenoxy) phenyl] ether, bis[4-(4-aminophenoxy) phenyl] ether, bis[3-(3-aminophenoxy) phenyl] ketone, bis[3-(4-aminophenoxy) phenyl] ketone, bis[4-(3-aminophenoxy) phenyl] ketone, bis[4-(4-aminophenoxy) phenyl] ketone, bis[3-(3-aminophenoxy) phenyl] sulfide, bis[3-(4-aminophenoxy) phenyl] sulfide, bis[4-(3-aminophenoxy) phenyl] sulfide, bis[4-(4-aminophenoxy) phenyl] sulfide, bis[3-(3-aminophenoxy) phenyl] sulfone, bis[3-(4-aminophenoxy) phenyl] sulfone, bis[4-(3-aminophenoxy) phenyl] sulfone, bis[4-(4-aminophenoxy) phenyl] sulfone, bis [3-(3-aminophenoxy) phenyl] methane, bis[3-(4-aminophenoxy) phenyl] methane, bis[4-(3-aminophenoxy) phenyl] methane, bis[4-(4-aminophenoxy) phenyl] methane, 2,2-bis[3-(3-aminophenoxy) phenyl] propane, 2,2-bis[3-(4-aminophenoxy) phenyl] propane, 2,2-bis[4-(3-aminophenoxy) phenyl] propane, 2,2-bis[4-(4-aminophenoxy) phenyl] propane, 2,2-bis[3-(3-aminophenoxy) phenyl]-1,1,1,3,3,3-hexafluoropropane, 2,2-bis[3-(4-aminophenoxy) phenyl]-1,1,1,3,3,3-hexafluoropropane, 2,2-bis[4-(3-aminophenoxy) phenyl]-1,1,1,3,3,3-hexafluoropropane, and 2,2-bis[4-(4-aminophenoxy) phenyl]-1,1,1,3,3,3-hexafluoropropane.

These may be used singly or two or more types thereof may be used in a mixture. Diamine to be used can be appropriately selected according to desired characteristics.

For example, the diamine structure described above can be used as diamine. Since it is preferable that diamine is used as the soft segment, it is preferable that a structure having amino groups in both terminals of the polyethylene oxide chain, the polypropylene oxide chain, the polycarbonate chain, and the polyester chain. As the soft segment-containing diamine, for example, "JEFFAMINE" series (manufactured by Huntsman International LLC. and Mitsui Fine Chemicals, Inc.) can be used as commercially available products. Specific examples thereof include JEFFAMINE D-230, JEFFAMINE D-400, JEFFAMINE D-2000, JEFFAMINE XTJ-510, JEFFAMINE XTJ-500, JEFFAMINE XTJ-501, JEFFAMINE XTJ-502, JEFFAMINE HK-511, JEFFAMINE EDR-148, JEFFAMINE XTJ-512, JEFFAMINE XTJ-542, JEFFAMINE XTJ-533, and JEFFAMINE XTJ-536.

Method of Synthesizing Polymer Having Urethane Bond

Examples of the polymer having a urethane bond include polyurethane. The polymer having a urethane bond can be obtained by polycondensing an isocyanate compound and a diol compound in presence of titanium, tin, and bismuth catalysts.

Compounds described above can be used as the isocyanate compound.

Specific examples of the diol compound include ethylene glycol, diethylene glycol, triethylene glycol, tetraethylene glycol, propylene glycol, dipropylene glycol, polyethylene glycol, polypropylene glycol, neopentyl glycol, 1,3-butylene glycol, 1,6-hexane diol, 2-butene-1,4-diol, 2,2,4-trimethyl-1,3-pentane diol, 1,4-bis-β-hydroxyethoxy cyclohexane, cyclohexane dimethanol, tricyclodecanedimethanol, hydrogenated bisphenol A, hydrogenated bisphenol F, an ethylene oxide adduct of bisphenol A, a propylene oxide adduct of bisphenol A, an ethylene oxide adduct of bisphenol F, a propylene oxide adduct of bisphenol F, an ethylene oxide adduct of hydrogenated bisphenol A, a propylene oxide adduct of hydrogenated bisphenol A, hydroquinone dihydroxyethyl ether, p-xylylene glycol, dihydroxyethylsulfone, bis(2-hydroxyethyl)-2,4-tolylene dicarbamate, 2,4-tolylene-bis(2-hydroxyethyl carbamide), bis(2-hydroxyethyl)-m-xylylene dicarbamate, bis(2-hydroxyethyl) isophthalate, 1,3-propane diol, 1,4-butane diol, 1,5-pentane diol, 1,7-heptane diol, 1,8-octane diol, 1,10-decane diol, cis-2-butene-1,4-diol, trans-2-butene-1,4-diol, catechol, resorcinol, hydroquinone, 4-methyl catechol, 4-t-butylcatechol, 4-acetyl catechol, 3-methoxy catechol, 4-phenyl catechol, 4-methyl resorcinol, 4-ethyl resorcinol, 4-t-butyl resorcinol, 4-hexyl resorcinol, 4-chloro resorcinol, 4-benzyl resorcinol, 4-acetyl resorcinol, 4-carbomethoxy resorcinol, 2-methyl resorcinol, 5-methyl resorcinol, t-butyl hydroquinone, 2,5-di-t-butyl hydroquinone, 2,5-di-t-amyl hydroquinone, tetramethyl hydroquinone, tetrachlorohydroquinone, methylcarboamino hydroquinone, methyl ureido hydroquinone, methylthio hydroquinone, benzonorbornene-3,6-diol, bisphenol A, bisphenol S, 3,3'-dichloro bisphenol S, 4,4'-dihydroxybenzophenone, 4,4'-dihydroxybiphenyl, 4,4'-thiodiphenol, 2,2'-dihydroxydiphenylmethane, 3,4-bis (p-hydroxyphenyl) hexane, 1,4-bis(2-(p-hydroxyphenyl) propyl) benzene, bis(4-hydroxyphenyl) methylamine, 1,3-dihydroxynaphthalene, 1,4-dihydroxynaphthalene, 1,5-dihydroxynaphthalene, 2,6-dihydroxynaphthalene, 1,5-dihydroxyanthraquinone, 2-hydroxy benzyl alcohol, 4-hydroxy benzyl alcohol, 2-hydroxy-3,5-di-t-butyl benzyl alcohol, 4-hydroxy-3,5-di-t-butyl benzyl alcohol, 4-hydroxyphenethyl alcohol, 2-hydroxyethyl-4-hydroxybenzoate, 2-hydroxyethyl-4-hydroxyphenyl acetate, resorcinol mono-2-hydroxyethyl ether, pentaethylene glycol, hexaethylene glycol, heptaethylene glycol, octaethylene glycol, di-1,2-propylene glycol, tri-1,2-propylene glycol, tetra-1,2-propylene glycol, hexa-1,2-propylene glycol, di-1,3-propylene glycol, tri-1,3-propylene glycol, tetra-1,3-propylene glycol, di-1,3-butylene glycol, tri-1,3-butylene glycol, hexa-1,3-butylene glycol, polyethylene glycol having an average molecular weight of 200, polyethylene glycol having an average molecular weight of 400, polyethylene glycol having an average molecular weight of 600, polyethylene glycol having an average molecular weight of 1,000, polyethylene glycol having an average molecular weight of 1,500, polyethylene glycol having an average molecular weight of 2,000, polyethylene glycol having an average molecular weight of 3,000, polyethylene glycol having an average molecular weight of 7,500, polypropylene glycol having an average molecular weight of 400, polypropylene glycol having an average molecular weight of 700, polypropylene glycol having an average molecular weight of 1,000, polypropylene glycol having an average molecular weight of 2,000, polypropylene glycol having an average molecular weight of 3,000, and polypropylene glycol having an average molecular weight of 4,000.

The diol compound can be used as a commercially available product, and examples thereof include a polyether diol compound such as PTMG650, PTMG1000, PTMG20000, PTMG3000, NEWPOL PE-61, NEWPOL PE-62, NEWPOL PE-64, NEWPOL PE-68, NEWPOL PE-71, NEWPOL PE-74, NEWPOL PE-75, NEWPOL PE-78, NEWPOL PE-108, NEWPOL PE-128, NEWPOL BPE-20, NEWPOL BPE-20F, NEWPOL BPE-20NK, NEWPOL BPE-20T, NEWPOL BPE-20G, NEWPOL BPE-40, NEWPOL BPE-60, NEWPOL BPE-100, NEWPOL BPE-180, NEWPOL BP-2P, NEWPOL BPE-23P, NEWPOL BPE-3P, NEWPOL BPE-5P, NEWPOL 50HB-100, NEWPOL 50HB-260, NEWPOL 50HB-400, NEWPOL 50HB-660, NEWPOL 50HB-2000, NEWPOL 50HB-5100 manufactured by Sanyo Chemical Industries, Ltd. Also, examples thereof further include a polyester diol compound, a polycarbonate diol compound, and a silicone diol compound.

As the polyester diol compound, POLYLITE series (manufactured by DIC Corporation) or KURARAY POLYOL P series, KURARAY POLYOL F series, KURARAY POLYOL N series, and KURARAY POLYOL PMNA series (manufactured by Kuraray Co., Ltd.), and PLACCEL series (manufactured by Daicel Corporation) can be suitably used.

As the polycarbonate diol compound, DURANOL series (manufactured by Asahikasei Chemicals Corporation), ETERNACOLL series (manufactured by Ube Industries, Ltd.), PLACCEL CD series (manufactured by Daicel Corporation), and KURARAY POLYOL C series (manufactured by Kuraray Co., Ltd.) can be suitably used.

As the silicone diol compound, carbinol modified silicone oil manufactured by Shin-Etsu Chemical Co., Ltd. can be used. Specifically, KF-6000, KF-6001, KF-6002, KF-6003, and the like can be suitably used.

In addition, the polymer having a urethane bond can be used in combination with the diol compound containing a carboxy group such as a 3,5-dihydroxybenzoic acid, a 2,2-bis(hydroxymethyl) propionic acid, a 2,2-bis(2-hydroxyethyl) propionic acid, a 2,2-bis(3-hydroxypropyl) propionic acid, a bis (hydroxymethyl) acetic acid, a bis(4-hydroxyphenyl) acetic acid, a 2,2-bis(hydroxymethyl) butyric acid, a 4,4-bis(4-hydroxyphenyl) pentanoic acid, a tartaric acid, N,N-dihydroxyethylglycine, and N,N-bis(2-hydroxyethyl)-3-carboxy-propionamide.

In addition, diol compounds disclosed in JP2003-177533A, JP1999-352691A (JP-H11-352691A), JP1998-260530A (JP-H10-260530A), JP2005-250158A, and JP2009-86321A can be preferably used.

Diol preferably has a polyethylene oxide chain, a polypropylene oxide chain, a polycarbonate chain, a polyester chain, and a silicone chain. In addition, diol preferably has a carbon-carbon unsaturated group or a polar group (an alcoholic hydroxyl group, a phenolic hydroxyl group, mercapto group, a carboxy group, a sulfo group, a sulfonamide group, a phosphate group, a cyano group, an amino group, a zwitterion-containing group, a metal hydroxide group, and a metal alkoxide group). For example, diol having a carbon-carbon unsaturated group or a polar group may use a 2,2-bis(hydroxymethyl) propionic acid.

As the diol compound containing the carbon-carbon unsaturated group, compounds disclosed in JP2007-187836A can be suitably used, in addition to BLEMMER GLM (manufactured by NOF Corporation) as a commercially available product.

In the case of polyurethane, monoalcohol or monoamine can be used as a polymerization terminator. The polymerization terminator can be introduced to the terminal portion in the main chain of polyurethane. As a method of introducing the soft segment to the terminal of polyurethane, polyalkylene glycol monoalkyl ether (polyethylene glycol monoalkyl ether and polypropylene monoalkyl ether are preferable), polycarbonate diol monoalkyl ether, polyester diol monoalkyl ether, polyester monoalcohol, or the like can be used.

In addition, a polar group or a carbon-carbon unsaturated group is introduced to the terminal of the main chain of polyurethane by using monoalcohol or monoamine having a polar group or a carbon-carbon unsaturated group. Examples thereof include a hydroxyacetic acid, a hydroxypropionic acid, 4-hydroxy benzyl alcohol, 3-mercapto-1-propanol, 2,3-dimercapto-1-propanol, 3-mercapto-1-hexanol, 3-hydroxypropane sulfonic acid, 2-cyanoethanol, 3-hydroxy glutaronitrile, 2-aminoethanol, 2-hydroxyethyl methacrylate, 2-hydroxyethyl acrylate, 2-aminoethyl methacrylate, and 2-aminoethyl acrylate.

In the case of polyurethane, it is preferable that an isocyanate compound portion functions as the hard segment and a diol compound portion functions as the soft segment.

Here, an action exhibited by the high polymer binder is described together with assumptions.

The polymer forming the high polymer binder (B) according to the invention is decomposed if the hard segment thereof applies pseudo crosslinking properties between polymer chains. Therefore, high elasticity and adhesiveness to an inorganic material are exhibited. Meanwhile, the soft segment contributes to the application of ion conductivity. The solid electrolyte or the active substance is dispersed in a more flexible soft segment by being dissolved and mixed with polymer. Further, if necessary, solid electrolyte or an active substance can be kept in the soft segment by having an adsorbing group or a polymerizable group in the soft segment portion. Therefore, it is expected that the ion concentration in the soft segment increases, and ion conductivity is improved. It is construed that the invention exhibits excellent effect by this action.

Among these, the high polymer binder (B) according to the invention is preferably the binder for all-solid-state secondary batteries made of the polymer having the repeating structure expressed by Formula (3) below.

Formula (3)

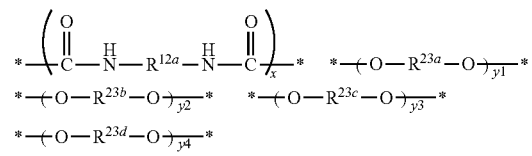

In Formula (3), $R^{12a}$ represents an arylene group having 6 to 22 carbon atoms, an alkylene group having 1 to 15 carbon atoms, and a combination thereof. $R^{23a}$ represents an alkylene group having 2 to 6 carbon atoms. $R^{23b}$ represents an alkylene group having an acidic group of which an acid dissociation constant pKa is 14 or less or a basic group of which pKa of a conjugate acid is 14 or less. $R^{23c}$ represents an alkylene group having a radical or cationic polymerizable group. $R^{23d}$ represents a diol residue of which a molecular weight is 500 to 10,000, and a glass-transition temperature is $-100°$ C. to $50°$ C. x represents 40 mol % to 60 mol %, $y^1$ represents 0 mol % to 40 mol %, $y^2$ represents 1 mol % to 20 mol %, $y^3$ represents 1 mol % to 40 mol %, $y^4$ represents 1 mol % to 40 mol %, and $x+y^1+y^2+y^3+y^4$ is 100 mol %. * represents a bonding position.

$R^{12a}$ has the same meaning as $R^{12}$ in Formula (I-2) and also has the same preferable range.

The number of carbon atoms of the alkylene group of $R^{23a}$ is preferably 2 to 5 and more preferably 2 to 4.

The number of carbon atoms of the alkylene group of $R^{23b}$ is preferably 1 to 12, more preferably 2 to 6, and still more preferably 2 to 4.

pKa of the acidic group in $R^{23b}$ is preferably 10 or less and more preferably 6 or less, and pKa of the conjugate acid of the basic group is preferably 10 or less and more preferably 6 or less.

In addition, the acid dissociation constant pKa means an acid dissociation constant in water at $25°$ C.

Specific examples of the acidic group include a carboxy group, a sulfo group, a phosphate group, a phosphonic acid group, a phenolic hydroxyl group, an alkylsulfonyl carbamoyl group, and an acetylacetonato group. Among them, a carboxy group, a sulfo group, or a phosphate group is preferable, and a carboxy group is more preferable.

Specific examples of the basic groups include an amino group, a pyridinyl group, and an amidine group. Among them, an amino group is preferable.

The number of carbon atoms of the alkylene group of $R^{23c}$ is preferably 1 to 12, more preferably 2 to 6, and still more preferably 2 to 3.

The radical or cationic polymerizable group in $R^{23c}$ includes the carbon-carbon unsaturated group described above, and has the same preferable ranges. Among them, the group expressed by Formula (1) is preferable.

The molecular weight of $R^{23d}$ is preferably 700 to 5,000 and more preferably 1,000 to 3,000. In addition, the glass-transition temperature is preferably −80° C. to 50° C. and more preferably −80° C. to 0° C.

Specific examples of the diol residue of $R^{23d}$ include a polyethylene oxide chain, a polypropylene oxide chain, a polycarbonate chain, a polyester chain, and a silicone chain. Among them, a polyethylene oxide chain or a polypropylene oxide chain is preferable.

The glass-transition temperature (Tg) is measured in the conditions below by using a dry sample and a differential scanning calorimeter "X-DSC7000" (manufactured by Seiko Instruments Inc.). The measurement is performed twice and the second measurement result is employed.

Atmosphere in a measurement chamber: nitrogen (50 mL/min)

Temperature rising rate: 5° C./min

Measurement starting temperature: −100° C.

Measurement ending temperature: 200° C.

Test pan: Aluminum pan

Mass of measurement specimen: 5 mg

Estimation of Tg: Tg is estimated by rounding half up by a decimal point or less of an intermediate temperature of the falling starting point and the falling ending point of a DSC chart.

$y^1$ is preferably 1 mol % to 40 mol %, $y^2$ is preferably 1 mol % to 10 mol %, $y^3$ is preferably 1 mol % to 20 mol %, and $y^4$ is preferably 10 mol % to 40 mol %.

The moisture concentration of the polymer forming the high polymer binder (B) according to the invention is preferably 100 ppm (on a mass basis) or lower, and Tg is preferably 100° C. or lower.

In addition, the polymer forming the high polymer binder (B) according to the invention may be crystallized and dried or the polymer solution may be used without change. It is preferable that the metal-based catalyst (urethanized and polyesterified catalyst=tin, titanium, and bismuth) is less. At the time of polymerization, the metal-based catalyst is less, but it is preferable that the metal concentration in the copolymers is 100 ppm (on a mass basis) or lower by removing the catalyst in the crystallization.

The catalyst used in the polymerization reaction of the polymer is not particularly limited. In addition, it is preferable to use the solvent that does not react with the inorganic solid electrolyte or the active substance and further that does not decompose the inorganic solid electrolyte or the active substance. For example, a hydrocarbon-based solvent (toluene, heptane, and xylene) or an ester-based solvent (ethyl acetate and propylene glycol monomethyl ether acetate), an ether-based solvent (tetrahydrofuran, dioxane, and 1,2-diethoxyethane), a ketone-based solvent (acetone, methyl ethyl ketone, and cyclohexanone), a nitrile-based solvent (acetonitrile, propionitrile, butyronitrile, and isobutyronitrile), and a halogen-based solvent (dichloromethane and chloroform) and the like can be used.

The weight average molecular weight of the polymer forming the high polymer binder (B) according to the invention is preferably 1,000 or greater, more preferably 5,000 or greater, and still more preferably 10,000 or greater. The upper limit thereof is preferably 1,000,000 or lower, more preferably 200,000 or lower, and still more preferably 100,000 or lower.

According to the invention, the molecular weight of the polymer means a weight average molecular weight, unless described otherwise. The weight average molecular weight can be calculated as the molecular weight in terms of polystyrene by GPC. At this point, the weight average molecular weight is detected with RI by using a GPC apparatus HLC-8220 (manufactured by Tosoh Corporation), using G3000HXL+G2000HXL as a column, and causing the flow rate at 23° C. to be 1 mL/min. An eluent can be selected from tetrahydrofuran (THF), chloroform, N-methyl-2-pyrrolidone (NMP), and m-cresol/chloroform (manufactured by Shonan Wako Junyaku K.K.). If the eluent is dissolved, THF is used.

Specific examples of the polymer forming the high polymer binder (B) according to the invention are provided below. In addition, the invention is not limited thereto. Also, hereinafter, the weight average molecular weight is described as Mw.

Exemplary compound (1)

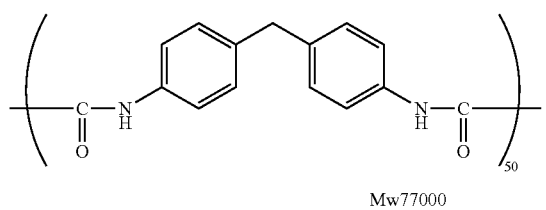 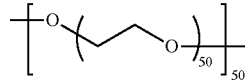

Mw77000

Exemplary compound (2)

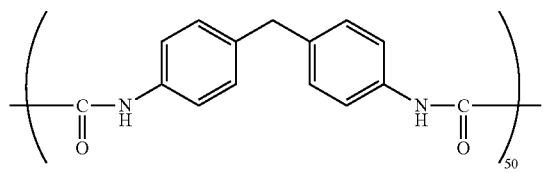 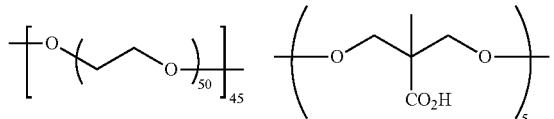

Mw56700

-continued
Exemplary compound (3)
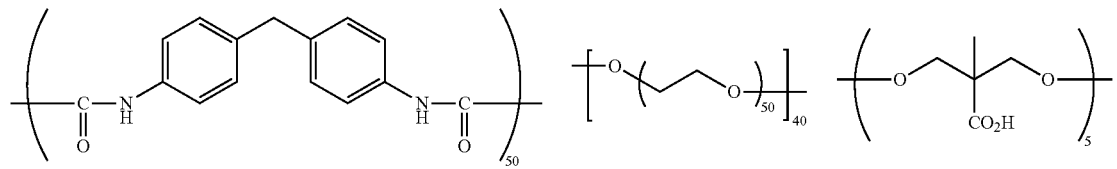
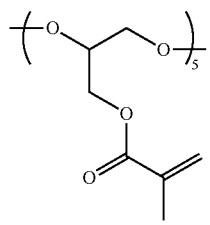
Mw32600
Exemplary compound (4)
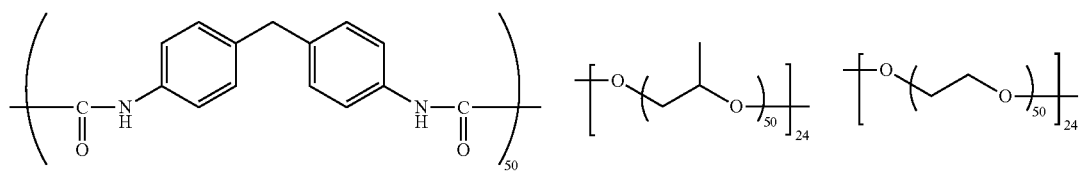
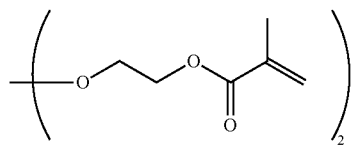
Mw49000
Exemplary compound (5)
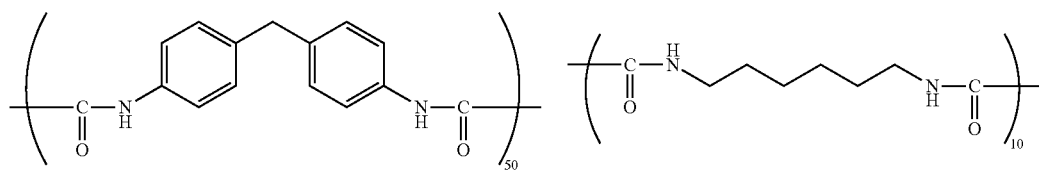
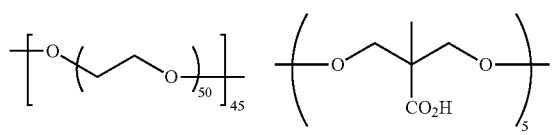
Mw49000
Exemplary compound (6)
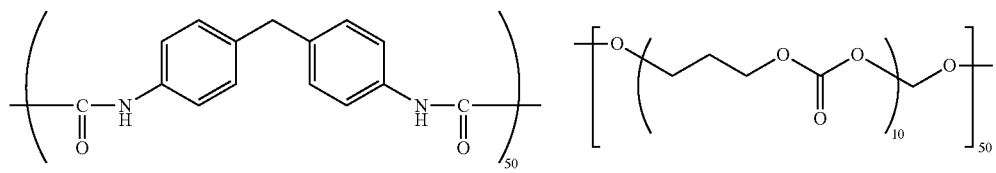
Mw53600
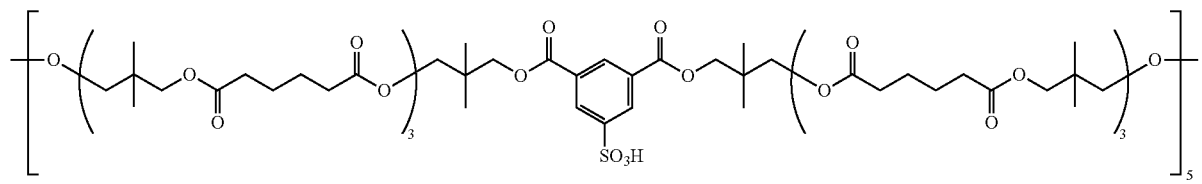

Exemplary compound (7)
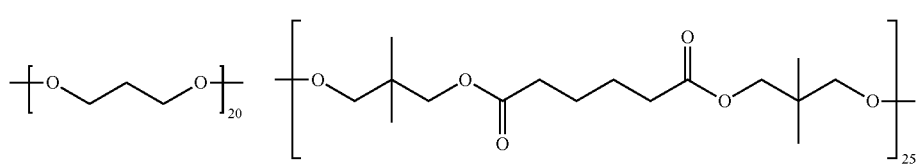
Mw67500
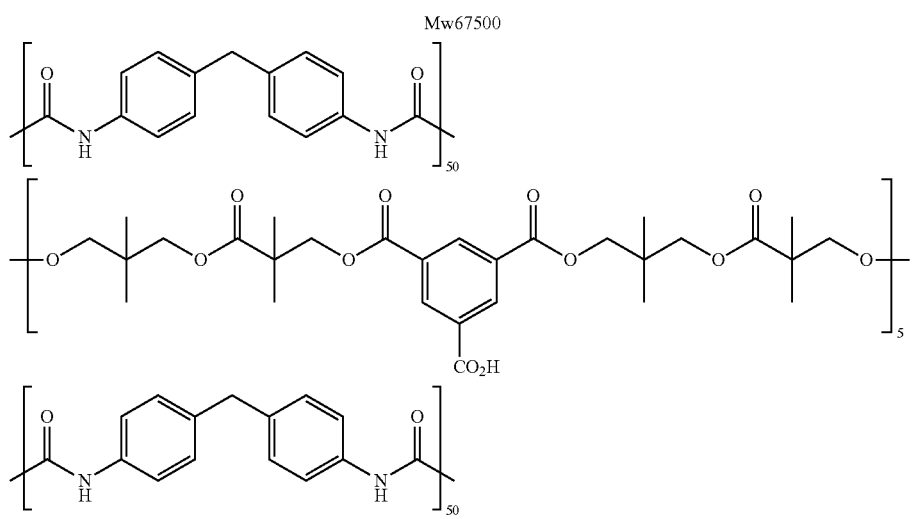
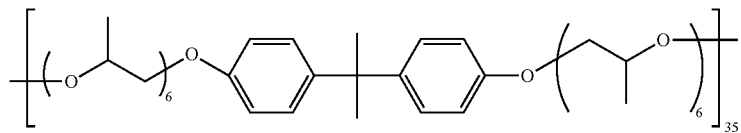
Exemplary compound (8)
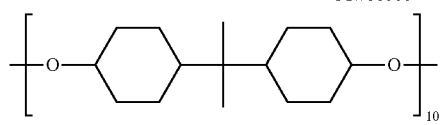
Mw88000
Exemplary compound (9)
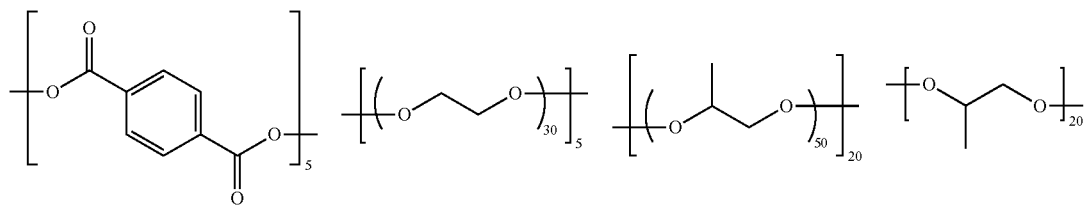
Mw56300
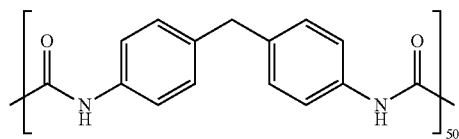
Exemplary compound (10)
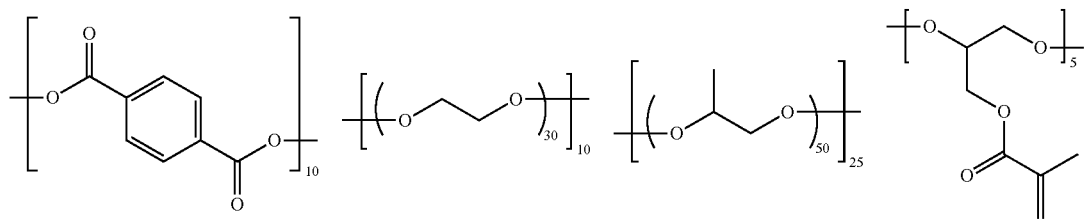
Mw56300

-continued
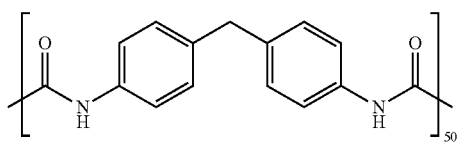
Exemplary compound (11)
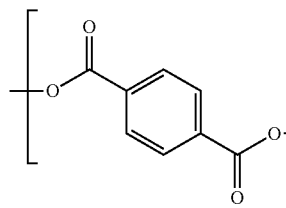
Mw98400
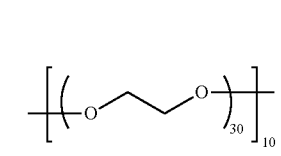
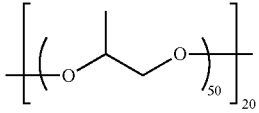
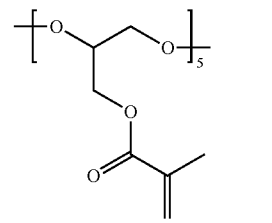
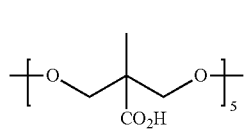
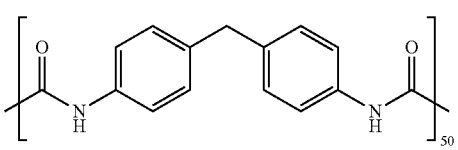
Exemplary compound (12)
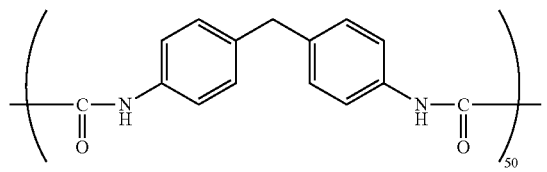
Mw64500
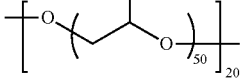
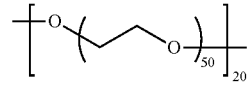
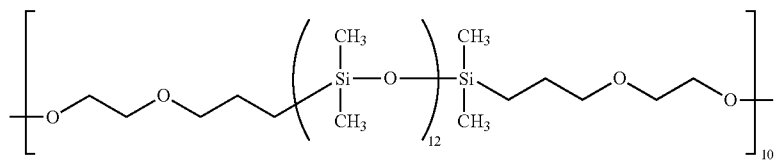
Exemplary compound (13)
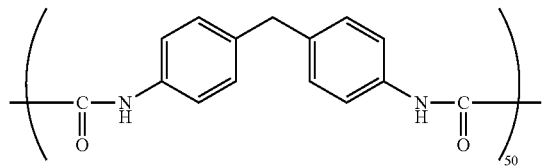
Mw64100
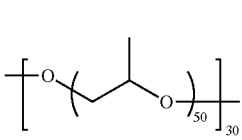
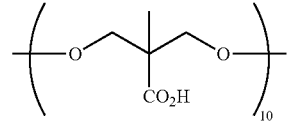
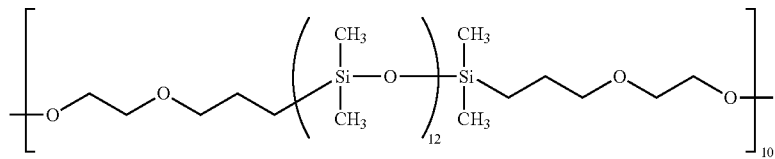
Exemplary compound (14)
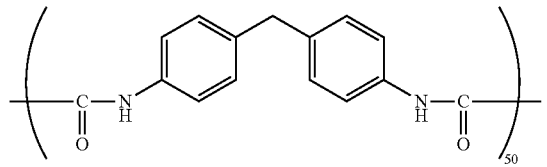
Mw44700
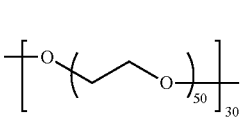
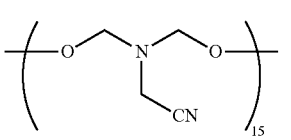

-continued
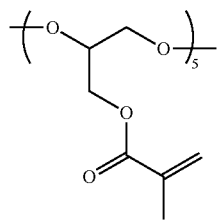
Exemplary compound (15)
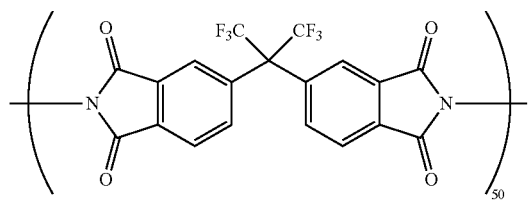 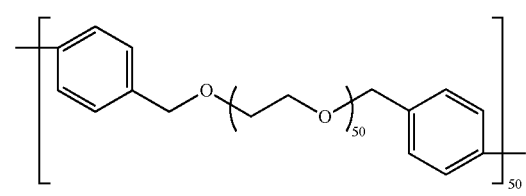
Mw67400
Exemplary compound (16)
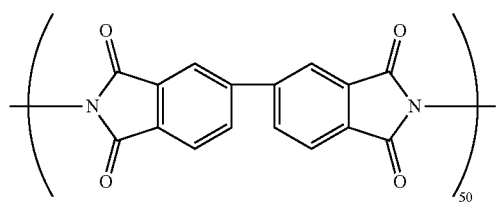 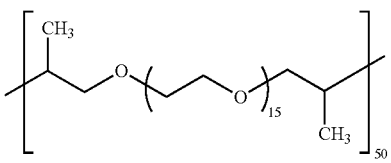
Mw87300
Exemplary compound (17)
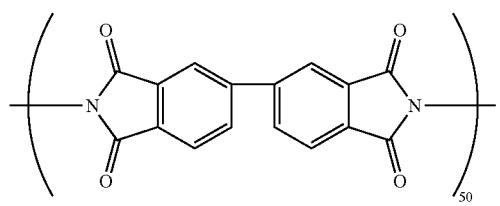 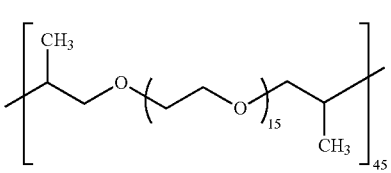
Mw67900
Exemplary compound (18)
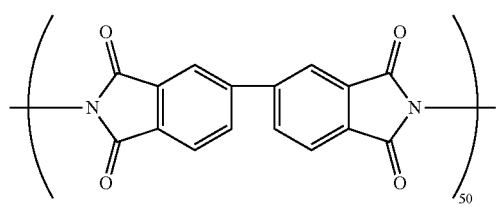 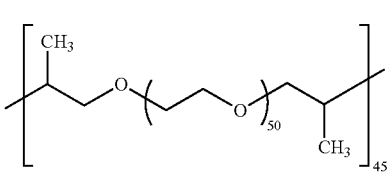
Mw56300
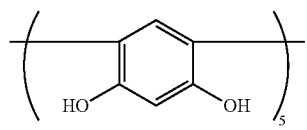
Exemplary compound (19)
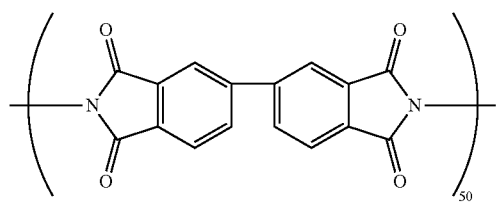 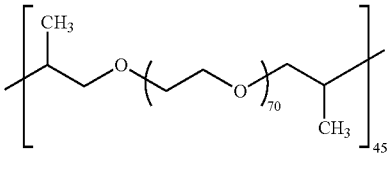
Mw83200

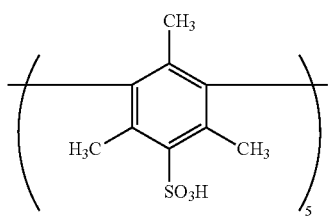
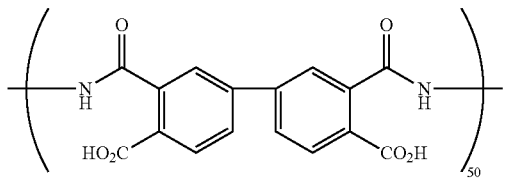 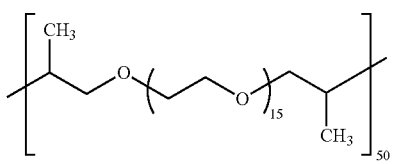
Exemplary compound (20)
Mw89700
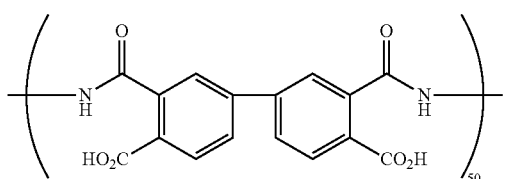 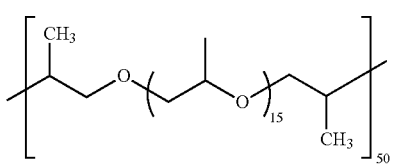
Exemplary compound (21)
Mw63400
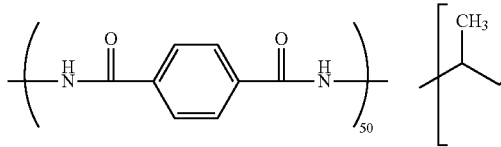 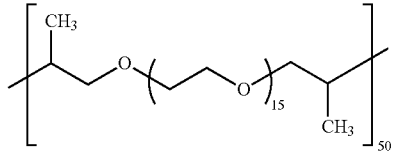
Exemplary compound (22)
Mw76200
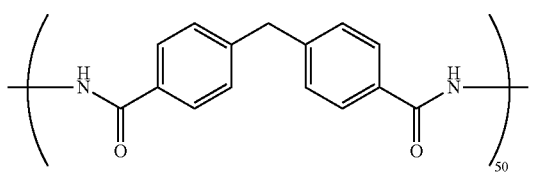 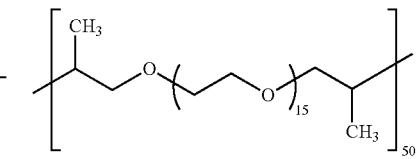
Exemplary compound (23)
Mw67300
Exemplary compound (24)
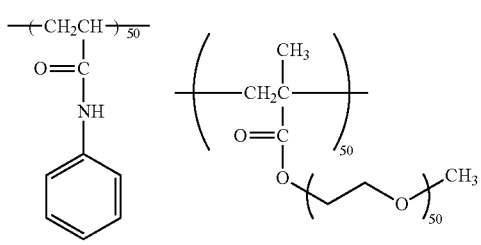
Mw34500
Exemplary compound (25)
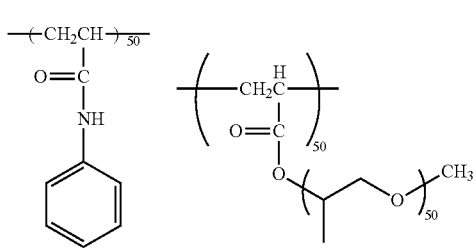
Mw54500

-continued
Exemplary compound (26)
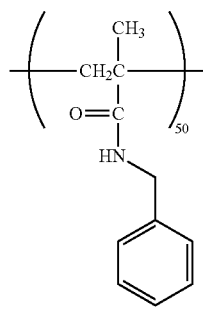 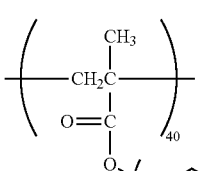
Mw78400
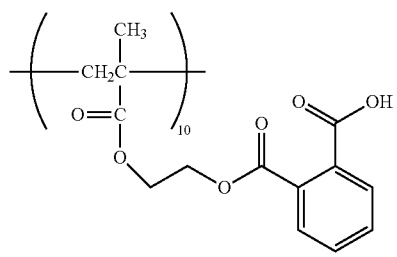
Exemplary compound (27)
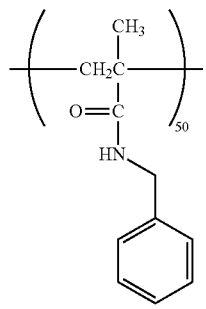 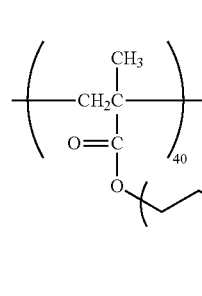
Mw65400
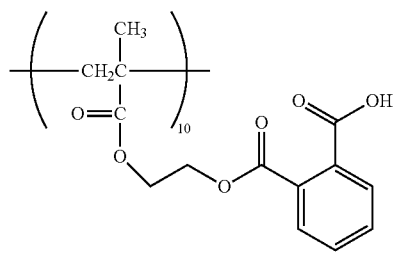
Exemplary compound (28)
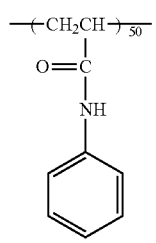 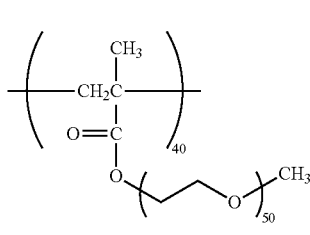 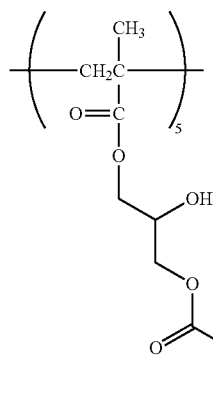 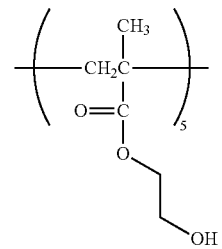
Mw67000

-continued
Exemplary compound (29)
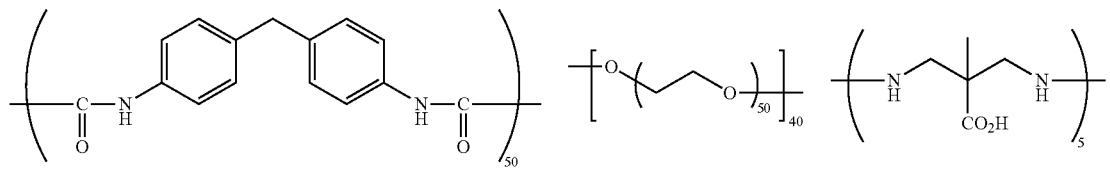
Mw32600
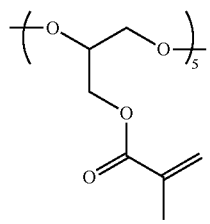
Exemplary compound (30)
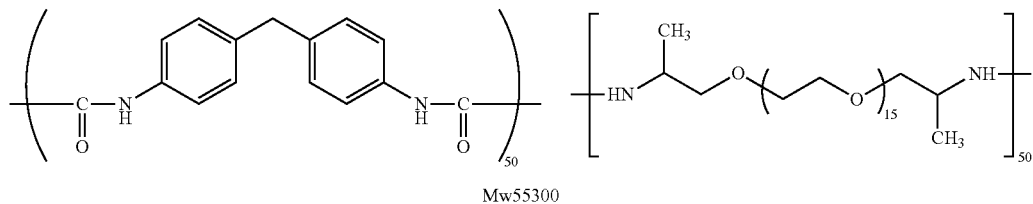
Mw55300
Exemplary compound (31)
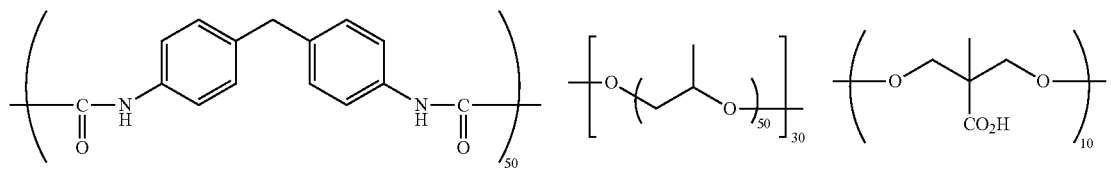
Mw64100
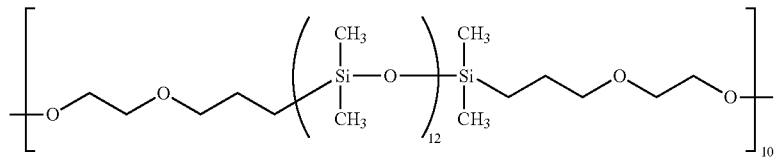
Exemplary compound (32)
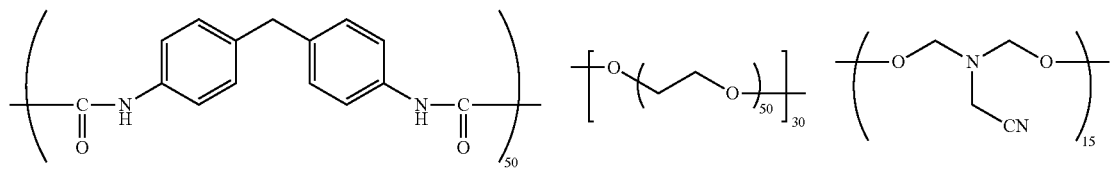
Mw44700
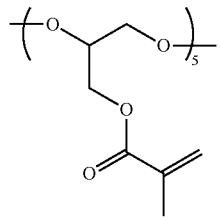

-continued
Exemplary compound (33)
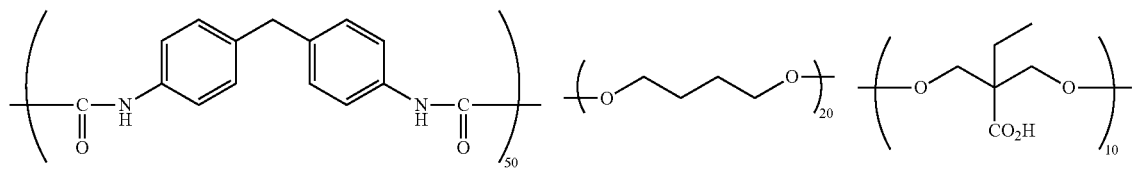
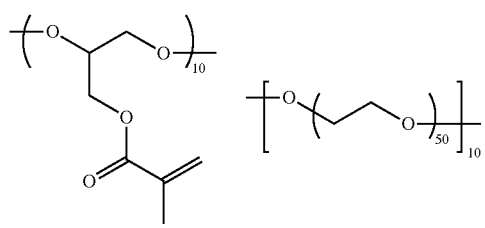
Exemplary compound (34)
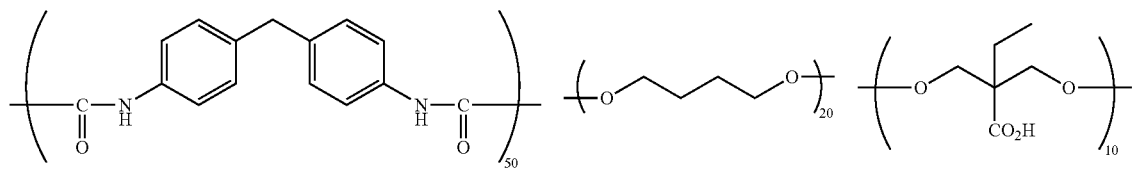
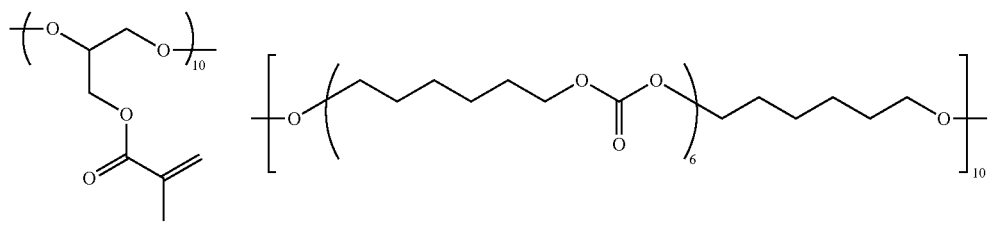
Exemplary compound (35)
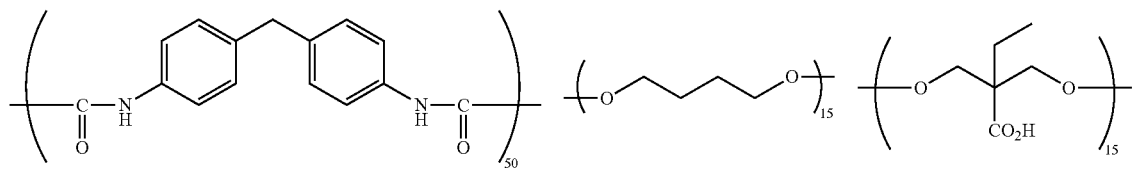
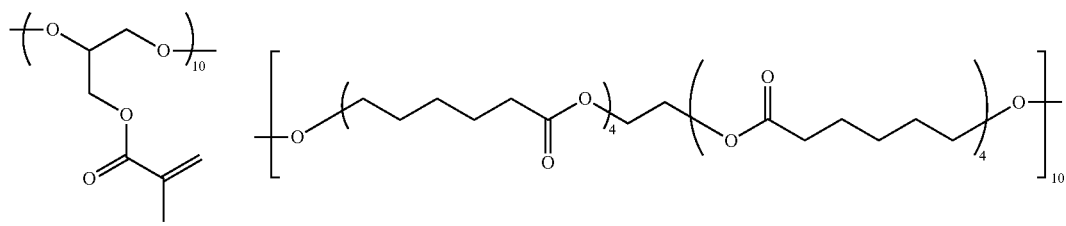
Exemplary compound (36)
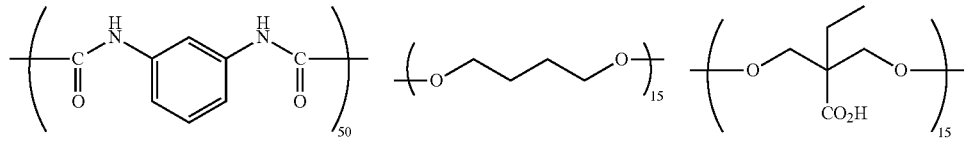

-continued
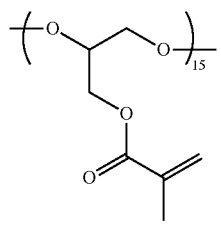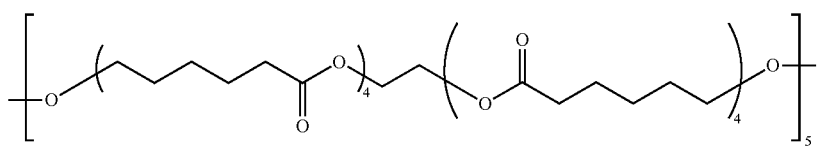
Exemplary compound (37)
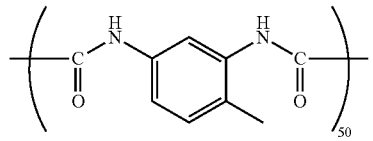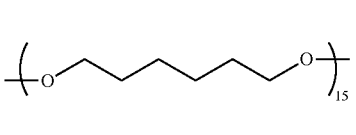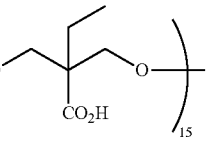
Mw72900
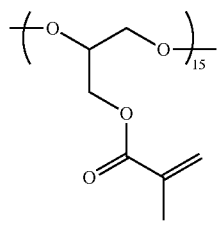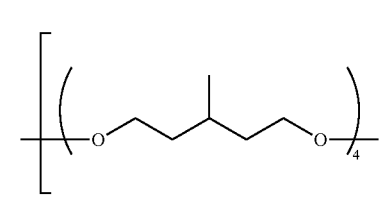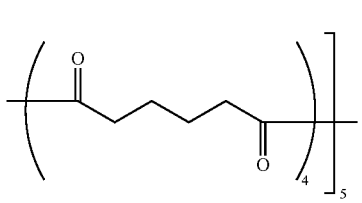
Exemplary compound (38)
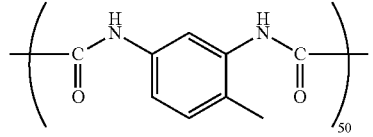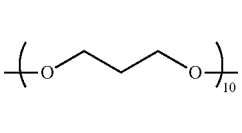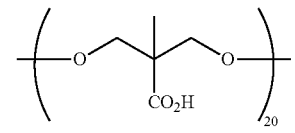
Mw82100
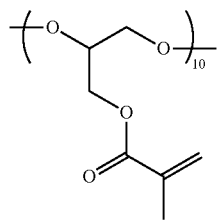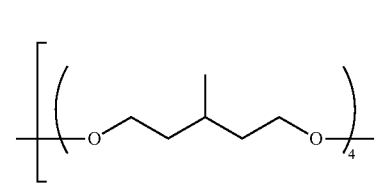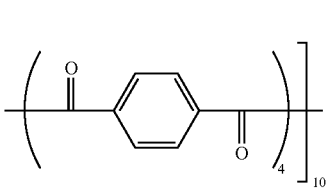
Exemplary compound (39)
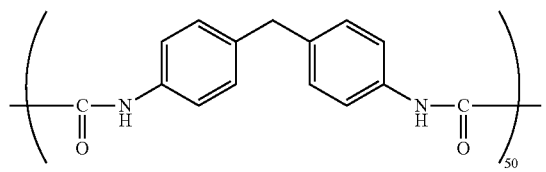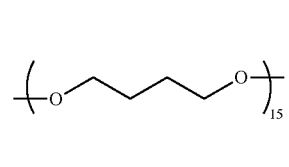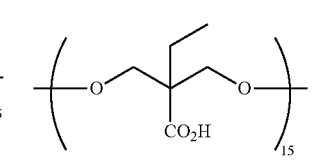
Mw67600
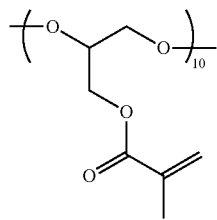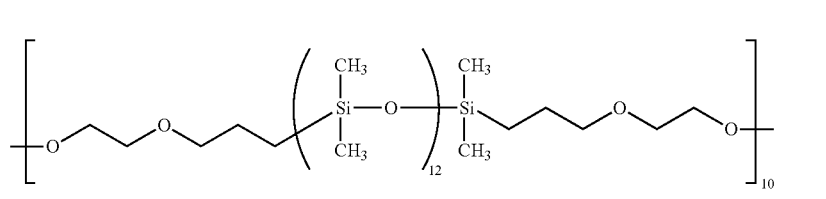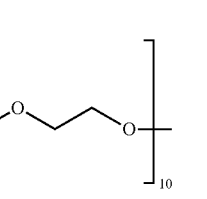

-continued
Exemplary compound (40)
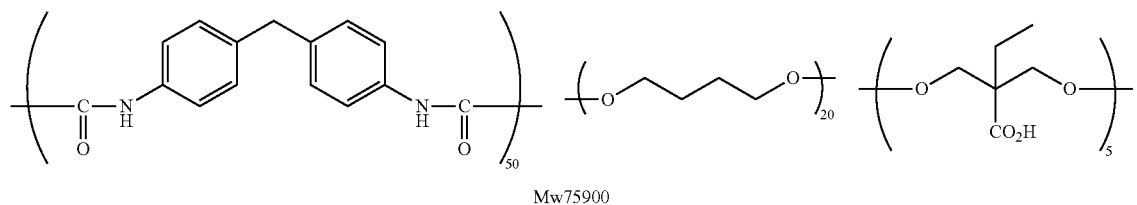
Exemplary compound (41)
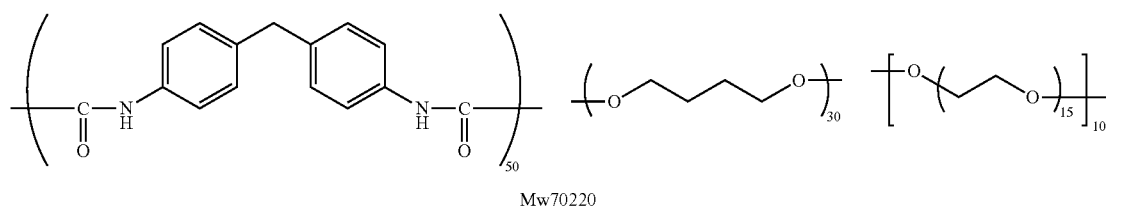
Exemplary compound (42)
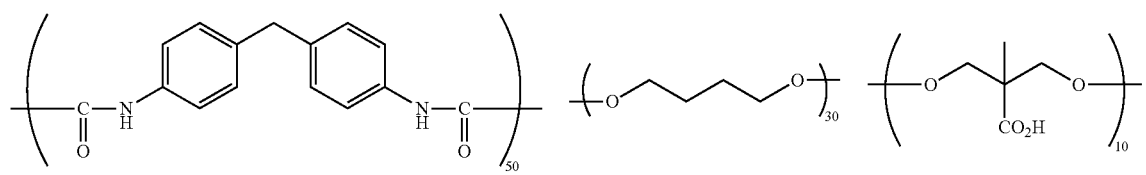
Exemplary compound (43)
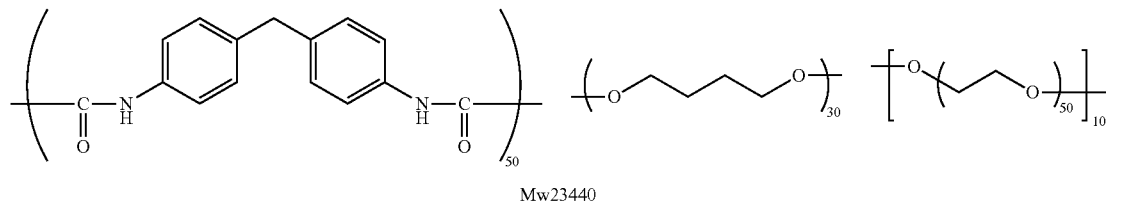
Exemplary compound (44)
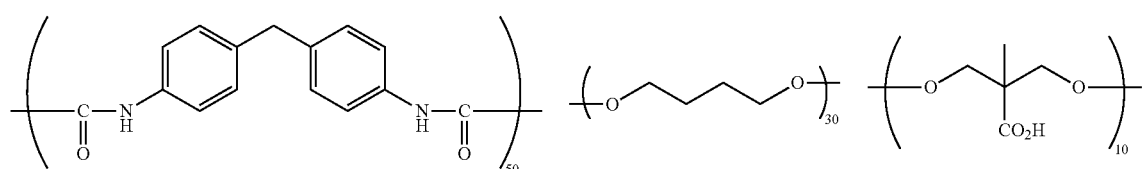
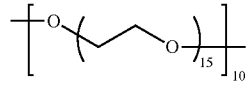

-continued
Exemplary compound (45)
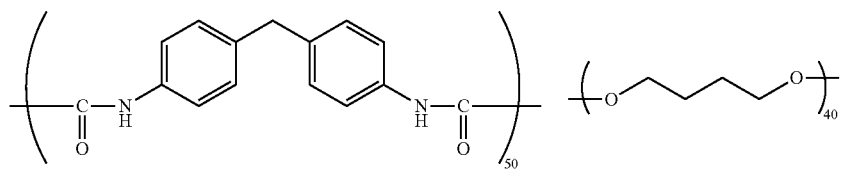
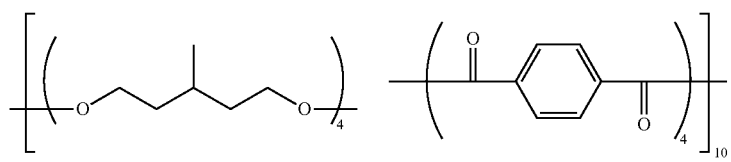
Exemplary compound (46)
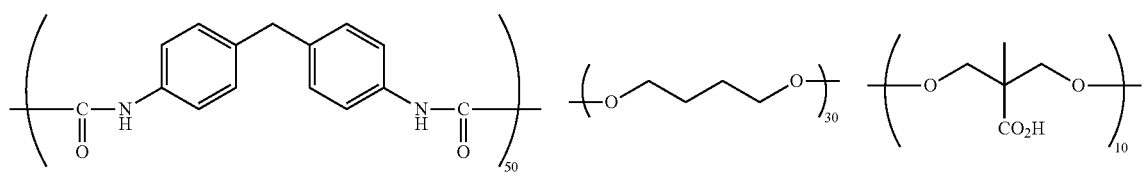
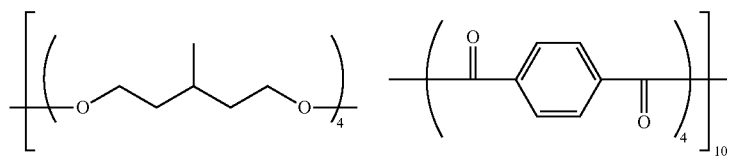
Exemplary compound (47)
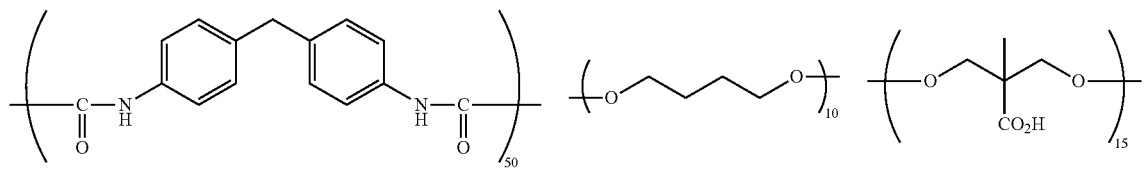
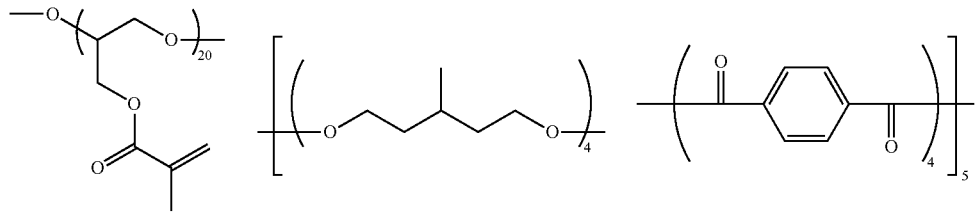
Exemplary compound (48)
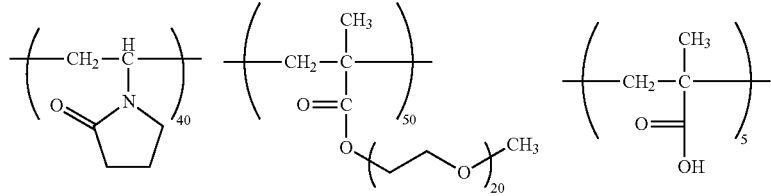
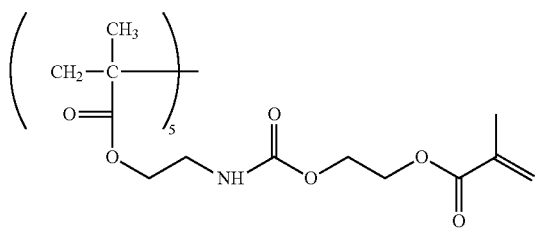

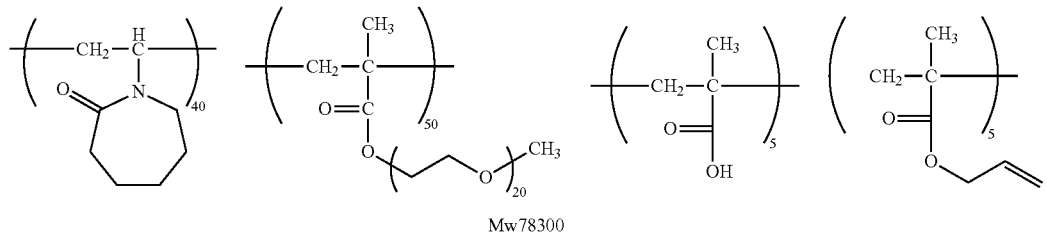

Exemplary compound (49)

Mw78300

If a satisfactory decrease and satisfactory maintenance of the interface resistance when the high polymer binder (B) is used in the all-solid-state secondary battery is considered, the concentration of the high polymer binder (B) in the solid electrolyte composition is preferably 0.1 mass % or greater, more preferably 1 mass % or greater, and still more preferably 2 mass % or greater with respect to 100 mass % of the solid component. In view of battery characteristics, the upper limit thereof is preferably 50 mass % or lower, more preferably 20 mass % or lower, and still more preferably 10 mass % or lower.

According to the invention, a mass ratio [(A+E)/B] of a total mass (total amount) of the inorganic solid electrolyte (A) and an electrode active substance (E) contained if necessary, to the mass of the high polymer binder (B) is preferably in the range of 1,000 to 1. This ratio is more preferably 500 to 2 and still more preferably 100 to 10.

(Lithium Salt (C))

As the lithium salt that can be used in the invention, lithium salt which is used in this type of products is preferable, but the lithium salt is not particularly limited. For example, the following are preferable.

(L-1) Inorganic lithium salt: an inorganic fluoride salt such as $LiPF_6$, $LiBF_4$, $LiAsF_6$, and $LiSbF_6$; perhalogenate such as $LiClO_4$, $LiBrO_4$, and $LiIO_4$; and an inorganic chloride salt such as $LiAlCl_4$.

(L-2) Fluorine-containing organic lithium salt: perfluoro alkane sulfonate such as $LiCF_3SO_3$; a perfluoro alkanesulfonyl imide salt such as $LiN(CF_3SO_2)_2$, $LiN(CF_3CF_2SO_2)_2$, $LiN(FSO_2)_2$, and $LiN(CF_3SO_2)(C_4F_9SO_2)$; a perfluoro alkane sulfonyl methide salt such as $LiC(CF_3SO_2)_3$; and fluoroalkyl fluoride phosphate such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$.

(L-3) Oxalatoborate salt: lithium bis(oxalato)borate and lithium difluoro oxalatoborate Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)$ are preferable, and a lithium imide salt such as $LiPF_6$, $LiBF_4$, $LiN(Rf^1SO_2)_2$, $LiN(FSO_2)_2$, and $LiN(Rf^1SO_2)(Rf^2SO_2)$ are still more preferable. Here, each of $Rf^1$ and $Rf^2$ independently represents a perfluoro alkyl group.

In addition, electrolyte used in the electrolyte solution may be used singly or two or more types thereof may be used in combination.

The content of the lithium salt is preferably 0 parts by weight or greater and more preferably 5 parts by weight or greater with respect to 100 parts by weight of the solid electrolyte (A). The upper limit thereof is preferably 50 parts by weight or lower and more preferably 20 parts by weight or lower.

(Dispersion Medium (D))

In the solid electrolyte composition according to the invention, a dispersion medium in which respective components are dispersed may be used. Examples of the dispersion medium include an aqueous organic solvent.

Specific examples thereof include an alcohol compound solvent such as methylalcohol, ethylalcohol, 1-propylalcohol, 2-propylalcohol, 2-butanol, ethylene glycol, propylene glycol, glycerin, 1,6-hexane diol, cyclohexane diol, sorbitol, xylitol, 2-methyl-2,4-pentane diol, 1,3-butane diol, and 1,4-butane diol and an ether compound solvent including alkylene glycol alkyl ether (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, diethylene glycol monobutyl ether, or the like).

Examples of the amide-based solvent include N,N-dimethylformamide, N-methyl-2-pyrrolidone, N-ethyl-2-pyrrolidone, 2-pyrrolidinone, 1,3-dimethyl-2-imidazolidinone, c-caprolactam, formamide, N-methyl formamide, acetamide, N-methyl acetamide, N,N-dimethylacetamide, N-methylpropionamide, and hexamethylphosphoric triamide.

Examples of the ketone-based solvent include acetone, methyl ethyl ketone, methyl isobutyl ketone, diethyl ketone, dipropyl ketone, diisopropyl ketone, diisobutyl ketone, and cyclohexanone.

Examples of the ether-based solvent include dimethyl ether, diethyl ether, tetrahydrofuran, cyclopentyl methyl ether, dimethoxyethane, and 1,4-dioxane.

Examples of the aromatic solvent include benzene, toluene, xylene, chlorobenzene, and dichlorobenzene.

Examples of the aliphatic solvent include hexane, heptane, octane, decane, and dodecane.

Examples of the nitrile-based solvent include acetonitrile, propionitrile, butyronitrile, isobutyronitrile, and benzonitrile.

(Positive Electrode Active Substance (E-1))

The positive electrode active substance is contained in the solid electrolyte composition according to the invention. The solid electrolyte composition containing the positive electrode active substance may be used as a composition as a positive electrode material. Transition metal oxide is preferably used in the positive electrode active substance. Among them, transition metal oxide having a transition element $M^a$ (1 type or more elements selected from Co, Ni, Fe, Mn, Cu, and V) is preferable. In addition, a mixed element $M^b$ (an element in Group 1 (Ia) of the periodic table of metal other than lithium, an element in Group 2 (IIa), Al, Ga, In, Ge, Sn, Pb, Sb, Bi, Si, P, B, and the like) may be mixed.

Examples of this transition metal oxide include a specific transition metal oxide including oxide expressed by any one of Formulae (MA) to (MC) below or include $V_2O_5$ and $MnO_2$, as additional transition metal oxide. A particle-state positive electrode active substance may be used in the positive electrode active substance.

Specifically, it is possible to use a transition metal oxide to which a lithium-ion can be reversibly inserted or emitted, and it is preferable to use the specific transition metal oxide described above.

Examples of the transition metal oxide appropriately include oxide including the transition element $M^a$. At this point, the mixed element $M^b$ (preferably Al) and the like are mixed. The mixture amount is preferably 0 mol % to 30 mol % with respect to the amount of the transition metal. It is more preferable that the transition element obtained by synthesizing elements such that the molar ratio of Li/Ma becomes 0.3 to 2.2.

[Transition Metal Oxide Expressed by Formula (MA) (Layered Rock Salt Structure)]

Among them, as the lithium-containing transition metal oxide, metal oxide expressed by the following formula is preferable.

$$Li_aM^1O_b \qquad \text{Formula (MA)}$$

In Formula (MA), $M^1$ has the same meaning as $M^a$ above, and also a preferable range thereof is the same. a represents 0 to 1.2 (preferably 0.2 to 1.2) and preferably represents 0.6 to 1.1. b represents 1 to 3, and preferably 2. A portion of $M^1$ may be substituted with the mixed element $M^b$.

The transition metal oxide expressed by Formula (MA) above typically has a layered rock salt structure.

The transition metal oxide expressed by Formula (MA) is more preferably expressed by the following formulae.

$$Li_gCoO_k \qquad \text{(MA-1)}$$

$$Li_gNiO_k \qquad \text{(MA-2)}$$

$$Li_gMnO_k \qquad \text{(MA-3)}$$

$$Li_gCo_jNi_{1-j}O_k \qquad \text{(MA-4)}$$

$$Li_gNi_jMn_{1-j}O_k \qquad \text{(MA-5)}$$

$$Li_gCo_jNi_iAl_{1-j-i}O_k \qquad \text{(MA-6)}$$

$$Li_gCo_jNi_iMn_{1-j-i}O_k \qquad \text{(MA-7)}$$

Here, g has the same meaning as a above and also a preferable range thereof is the same. j represents 0.1 to 0.9. i represents 0 to 1. However, 1-j-i becomes 0 or greater. k has the same meaning as b above and also a preferable range thereof is the same.

Specific examples of the transition metal compound include $LiCoO_2$ (lithium cobalt oxide [LCO]), $LiNi_2O_2$ (lithium nickel oxide) $LiNi_{0.85}Co_{0.01}Al0.05O_2$ (lithium nickel cobalt aluminum oxide [NCA]), $LiNi_{0.33}Co_{0.33}Mn_{0.33}O_2$ (lithium nickel cobalt manganese oxide [NMC]), and $LiNi_{0.5}Mn_{0.5}O_2$ (lithium manganese oxide).

Though partially overlapped, if the transition metal oxide expressed by Formula (MA) is indicated by changing the indication, the following are also provided as preferable examples.

(i) $Li_gNi_{xc}Mn_{yc}Co_{zc}O_2$ (xc>0.2, yc>0.2, zc≥0, xc+yc+zc=1)

Representative transition metal oxide:
$Li_gNi_{1/3}Mn_{1/3}Co_{1/3}O_2$
$Li_gNi_{1/2}Mn_{1/2}O_2$ (ii) $Li_gNi_{xd}Co_{yd}Al_{zd}O_2$ (xd>0.7, yd>0.1, 0.1≥zd≥0.05, xd+yd+zd=1)

Representative transition metal oxide:
$Li_gNi_{0.8}Co_{0.15}Al_{0.05}O_2$

[Transition Metal Oxide Expressed by Formula (MB) (Spinel-Type Structure)]

Among them, as the lithium-containing transition metal oxide, transition metal oxide expressed by Formula (MB) below is also preferable.

$$Li_cM^2{}_2O_d \qquad \text{Formula (MB)}$$

In Formula (MB), $M^2$ has the same meaning as $M^a$ above and also a preferable range thereof is the same. c represents 0 to 2 (preferably 0.2 to 2) and preferably represents 0.6 to 1.5. d represents 3 to 5, and preferably represents 4.

The transition metal oxide expressed by Formula (MB) is more preferably transition metal oxide expressed by the following formulae.

$$Li_mMn_2O_n \qquad \text{(MB-1)}$$

$$Li_mMn_pAl_{2-p}O_n \qquad \text{(MB-2)}$$

$$Li_mMn_pNi_{2-p}O_n \qquad \text{(MB-3)}$$

m has the same meaning as c and also a preferable range thereof is the same. n has the same meaning as d. p represents 0 to 2.

Specific examples of the transition metal compound include $LiMn_2O_4$ and $LiMn_{1.5}Ni_{0.5}O_4$.

As the transition metal oxide expressed by Formula (MB), the following are also provided as preferable examples.
(a) $LiCoMnO_4$
(b) $Li_2FeMn_3O_8$
(c) $Li_2CuMn_3O_8$
(d) $Li_2CrMn_3O_8$
(e) $Li_2NiMn_3O_8$ Among the above, in view of high capacity and high output, an electrode including Ni is more preferable.

[Transition Metal Oxide Expressed by Formula (MC)]

As the lithium-containing transition metal oxide, lithium-containing transition metal phosphorus oxide is preferable. Among them, transition metal oxide expressed by Formula (MC) below is also preferable.

$$Li_eM^3(PO_4)_f \qquad \text{Formula (MC)}$$

In Formula (MC), e represents 0 to 2 (preferably 0.2 to 2) and preferably 0.5 to 1.5. f represents 1 to 5 and preferably represents 1 to 2.

$M^3$ above represents one or more types of elements selected from the group consisting of V, Ti, Cr, Mn, Fe, Co, Ni, and Cu. $M^3$ above may be substituted with other metal such as Ti, Cr, Zn, Zr, and Nb, in addition to the mixed element Mb above. Specific examples thereof include an olivine-type iron phosphate salt such as $LiFePO_4$ and $Li_3Fe_2(PO_4)_3$, iron pyrophosphates such as $LiFeP_2O_7$, cobalt phosphates such as $LiCoPO_4$, and a monoclinic nasicon-type vanadium phosphate salt such as $Li_3V_2(PO_4)_3$ (vanadium lithium phosphate).

In addition, the values of a, c, g, m, and e representing the composition of Li are values that are changed depending on charging and discharging, and are typically evaluated by the values in a stable state when Li is contained. In Formulae (a)

to (e) above, the composition of Li is indicated with specific values, but this is changed depending on an operation of the battery in the same manner.

According to the invention, the average particle size of the positive electrode active substance used as a nonaqueous secondary battery is not particularly limited. In addition, the average particle size is preferably 0.1 µm to 50 µm. In order to cause the positive electrode active substance to have a predetermined particle size, a general pulverizer and a general classifier may be used. The positive electrode active substance obtained by the baking method may be used after being washed with water, an acidic aqueous solution, an alkaline aqueous solution, or an organic dissolving agent.

The concentration of the positive electrode active substance is not particularly limited. In addition, the concentration in the solid electrolyte composition is preferably 20% by mass to 90% by mass and more preferably 40% by mass to 80% by mass with respect to 100% by mass of the solid component.

(Negative Electrode Active Substance (E-2))

The negative electrode active substance may be contained in the solid electrolyte composition according to the invention. In this manner, the solid electrolyte composition containing the negative electrode active substance may be used as a composition for the negative electrode material. As the negative electrode active substance, an active substance to which a lithium-ion can be reversibly inserted or emitted is preferable. These material is not particularly limited, and examples thereof include carbonaceous material, metal oxide such as tin oxide and silicon oxide, metal composite oxide, a single substance of lithium, a lithium alloy such as a lithium aluminum alloy, and metal that can form an alloy with lithium such as Sn or Si. These may be used singly or two or more types thereof may be used in arbitrary combinations and ratios. Among these, the carbonaceous material or lithium composite oxide is preferably used in view of safety. In addition, as the metal composite oxide, metal composite oxide that can occlude or emit lithium is preferable. The material thereof is not particularly limited, but a material that contains titanium and/or lithium as the constituent component is preferable in view of characteristics of charging and discharging at high current density.

The carbonaceous material used as the negative electrode active substance is a material that is substantially made of carbon. Examples thereof include petroleum pitch, natural graphite, artificial graphite such as vapor phase-grown graphite, and a carbonaceous material obtained by baking various synthetic resins such as a PAN-based resin or a furfuryl alcohol resin. Examples thereof further include various carbon fibers such as a PAN-based carbon fiber, a cellulose-based carbon fiber, a pitch-based carbon fiber, a vapor phase-grown carbon fiber, a dehydrated PVA-based carbon fiber, a lignin carbon fiber, a glass-state carbon fiber, and an active carbon fiber, a mesophase microsphere, a graphite whisker, and a flat plate-shaped graphite.

These carbonaceous materials may be divided into a hardly graphitizable carbon material and a graphite-based carbon material according to the degree of graphitization. In addition, the carbonaceous material preferably has surface intervals, density, and sizes of crystallite as disclosed in JP1987-22066A (JP-S62-22066A), JP1990-6856A (JP-H2-6856A), and JP1991-45473A (JP-H3-45473A). The carbonaceous material does not have to be a single material, and a mixture of natural graphite and artificial graphite disclosed in JP1993-90844A (JP-H5-90844A), graphite having a coating layer disclosed in JP1994-4516A (JP-H6-4516A), and the like can be used.

As the metal oxide and the metal composite oxide that are applied as the negative electrode active substance, amorphous oxide is particularly preferable, and, further, chalcogenide which is a reaction product of a metal element and an element in Group 16 in the periodic table can be preferably used. The expression "amorphous" herein means to have a broad scattering band having a vertex in an area of 20° to 40° in 2θ values in the X-ray diffraction method using CuKα rays, and may have crystalline diffraction lines. The strongest strength of the crystalline diffraction lines seen at 40° to 70° in the 2θ values is preferably 100 times or less and more preferably 5 times or less in the diffraction line intensity in the vertex of a broad scattering band seen at 20° to 40° in the 2θ value, and it is particularly preferable that oxide does not have a crystalline diffraction line.

Among the compound groups made of amorphous oxide and chalcogenide, amorphous oxide and chalcogenide of a metalloid element are more preferable, and an element of Groups 13 (IIIB) to 15 (VB) in the periodic table, a single substance of Al, Ga, Si, Sn, Ge, Pb, Sb, or Bi or oxide made of a combination obtained by combining two or more types thereof, and chalcogenide are particularly preferable. Specific examples of preferable amorphous oxide and chalcogenide preferably include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $Sn_{S2}$, PbS, $PbS_2$, $Sb_2S_3$, $Sb_2S_5$, and $SnSiS_3$. In addition, these may be composite oxide with lithium oxide, for example, $Li_2SnO_2$.

The average particle size of the negative electrode active substance is preferably 0.1 µm to 60 µm. In order to cause the negative electrode active substance to have a predetermined particle diameter, a well-known pulverizer and a well-known classifier are used. For example, a mortar, a ball mill, a sand mill, a vibrating ball mill, a satellite ball mill, a planetary ball mill, a swirling air stream-type jet mill, and a sieve are appropriately used. At the time of pulverizing, wet pulverization in which an organic solvent such as water or methanol coexist may be performed, if necessary. In order to obtain a desired particle diameter, classification is preferably performed. A pulverization method is not particularly limited, and a sieve, an air classifier, or the like can be used, if necessary. As the classification, both dry-type classification and wet-type classification can be used.

The chemical formula of the compound obtained by the baking method can be calculated in an induction coupling plasma (ICP) emission spectrophotometric analysis method as a measuring method or can be calculated from a mass difference between particles before and after baking, as a simple method.

Examples of the negative electrode active substance that can be used together with an amorphous oxide negative electrode active substance mainly using Sn, Si, and Ge appropriately include a carbon material that can occlude and emit lithium-ion, lithium metal or lithium, lithium alloy, or metal that can be formed to be an alloy with lithium.

The negative electrode active substance preferably contains a titanium atom. More specifically, since the volume of $Li_4Ti_5O_{12}$ is small when a lithium-ion is occluded and emitted, quick charging-discharging properties are excellent, the deterioration of the electrode is prevented, and the lifespan of the lithium-ion secondary battery can be improved. Therefore, $Li_4Ti_5O_{12}$ is preferable. Stability of the secondary battery in various use condition improves due to the combination between a specific negative electrode and a further specific electrolyte solution.

The concentration of the negative electrode active substance is not particularly limited, but the concentration in the solid electrolyte composition is preferably 10% by mass to 80% by mass and more preferably 20% by mass to 70% by mass with respect to 100% by mass of the solid component.

In addition, the embodiment above describes an example in which a positive electrode active substance and a negative electrode active substance is contained in the solid electrolyte composition according to the invention, but the invention is not limited to thereto.

For example, a paste including a positive electrode active substance and a negative electrode active substance as the binder composition that does not include the high polymer binder may be prepared. At this point, it is preferable that the solid electrolyte is contained. In this manner, the positive electrode material and the negative electrode material which are commonly used are combined, and the solid electrolyte composition relating to the preferable embodiment of the invention may be used to form a solid electrolyte layer.

<Collector (Metal Foil)>

An electron conductor that does not cause a chemical change is preferable as the collector of the positive•negative electrodes. As the collector of the positive electrode, in addition to aluminum, stainless steel, nickel, titanium, and the like, a product obtained by treating carbon, nickel, titanium, or silver on the surface of aluminum and stainless steel is preferable. Among them, aluminum and an aluminum alloy are more preferable. As the negative electrode collector, aluminum, copper, stainless steel, nickel, and titanium are preferable, and aluminum, copper, and a copper alloy are more preferable.

As the form of the collector, a sheet-shaped collector is commonly used. In addition, a net, a punched collector, a lath body, a porous body, a foam body, a molded body of a fiber group, and the like can be used.

The thickness of the collector is not particularly limited, but the thickness is preferably 1 μm to 500 μm. In addition, unevenness is preferably formed on the collector surface by a surface treatment.

<Manufacturing of all-Solid-State Secondary Battery>

Manufacturing of the all-solid-state secondary battery may be performed by the common method. Specifically, examples of the method according to the invention include a method of making an electrode sheet for batteries on which a coating film is formed by applying the solid electrolyte composition on a metallic foil that becomes a collector.

For example, the composition that becomes the positive electrode material is applied on the metallic foil which is the positive electrode collector, and the positive electrode active substance layer is formed so as to manufacture the positive electrode sheet for batteries. Subsequently, the solid electrolyte composition according to the invention is applied on the positive electrode active substance layer, so as to form the solid electrolyte layer. Further, the composition that becomes the negative electrode material is applied on the solid electrolyte layer, so as to form the negative electrode active substance layer. Additionally, the structure of the all-solid-state secondary battery in which the solid electrolyte layer is inserted between the positive electrode layer and the negative electrode layer can be obtained by overlapping the collector (metallic foil) on the negative electrode side on the negative electrode active substance layer.

In addition, the method of applying the respective compositions may be performed in the normal method. At this point, after the composition for making the positive electrode active substance layer, the composition (solid electrolyte composition) for making the inorganic solid electrolyte layer, and the composition for making the negative electrode active substance layer are respectively applied, a drying treatment may be performed, or after the multilayer application is performed, a drying treatment may be performed. Otherwise, the respective compositions may be stacked by transferring after the respective compositions are applied on another base material.

The drying temperature is not particularly performed. In addition, the lower limit thereof is preferably 30° C. or higher and more preferably 60° C. or higher. The upper limit thereof is preferably 300° C. or lower and more preferably 250° C. or lower. If the heating is performed at this temperature range, the dispersion medium is removed, such that the solid electrolyte composition can be caused to be in the solid state. In this manner, in the all-solid-state secondary battery, satisfactory binding properties and ion conductivity in non-pressurization can be obtained.

[Use of all-Solid-State Secondary Battery]

The all-solid-state secondary battery according to the invention can be applied to various uses. The use aspect is not particularly limited, but, if the all-solid-state secondary battery is mounted in an electronic device, examples thereof include a notebook personal computer, a pen input personal computer, a mobile computer, an electron book player, a cellular phone, a cordless phone slave unit, a pager, a handy terminal, a portable fax machine, a portable copying machine, a portable printer, a headphone stereo, a video movie, a liquid crystal television, a handy cleaner, a portable CD, a mini disc, an electric shaver, a transceiver, an electronic organizer, a calculator, a portable tape recorder, radio, a backup power supply, and a memory card. In addition, examples of additional consumer use include an automobile, an electric motor vehicle, a motor, lighting equipment, a toy, a game machine, a load conditioner, a clock, a stroboscope, a camera, and medical equipment (a pacemaker, a hearing aid, and a shoulder massager). Further, the all-solid-state secondary battery can be used for military or space. In addition, the all-solid-state secondary battery can be combined with a solar battery.

Among these, the all-solid-state secondary battery is preferably applied to an application that requires discharging properties at high capacity and a high rate. For example, in an electric storage facility and the like in which high capacity enhancement is expected in the future, high safety is necessary, and thus compatibility between battery properties is required. In addition, a high capacity secondary battery is mounted on an electric car and the like, a use in which charging is performed everyday at home is assumed, and safety at overcharging is further required. According to the invention, an excellent effect can be achieved in response to these use forms.

According to the invention, the following aspects are also preferable.

[1] An electrode sheet for batteries obtained by disposing the solid electrolyte composition on a metal foil and forming a film.

[2] An all-solid-state secondary battery including a positive electrode active substance layer, a negative active substance layer, and a solid electrolyte layer, in which at least any one layer of the positive electrode active substance layer, the negative active substance layer, and the solid electrolyte layer is formed of the solid electrolyte composition.

The all-solid-state secondary battery refers to a secondary battery that is formed of a positive electrode, a negative electrode, and an electrolyte which are all solid. In other words, the all-solid-state secondary battery is different from an electrolyte solution-type secondary battery in which a carbonate-based solvent is used as an electrolyte. Among these, the invention relates to an inorganic all-solid-state secondary battery. The all-solid-state secondary battery is classified into the organic (high molecular) all-solid-state secondary battery using a high molecular compound such as polyethylene oxide as an electrolyte and the inorganic all-solid-state secondary battery using LLT, LLZ, or the like. In addition, a high molecular compound can be applied as binders of the positive electrode active substance, the negative electrode active substance, and the inorganic solid electrolyte particle, without preventing application to an inorganic all-solid-state secondary battery.

The inorganic solid electrolyte is different from the electrolyte (high molecular electrolyte) using a high molecular compound as an ion conducting medium, and the inorganic compound becomes an ion conducting medium. Specific examples thereof include LLT or LLZ above. The inorganic solid electrolyte itself does not emit a positive ion (Li ion), but exhibits an ion transporting function. In contrast, an electrolyte solution or a material that becomes a supply source of an ion that is added to a solid electrolyte layer and emits a positive ion (Li ion) is called an electrolyte, but when the electrolyte is differentiated from the electrolyte as the ion transferring material, the electrolyte is called an "electrolyte salt" or a "supporting electrolyte". Examples of the electrolyte salt include lithium bistrifluoromethane sulfone imide (LiTFSI).

According to the invention, the expression "composition" means a mixture in which two or more components are evenly mixed. However, evenness may be substantially maintained, and aggregation or uneven distribution may partially occur in a range in which a desired effect is exhibited.

EXAMPLES

Hereinafter, the invention is specifically described with reference to examples, but the invention is not limited thereto. In the examples below, the expressions "part" and "%" are on a mass basis, unless otherwise described.

Synthesization Examples

Synthesization of Exemplary Compound (1)

2.5 g of 4,4'-diphenylmethane diisocyanate [manufactured by Wako Pure Chemical Industries, Ltd.] and 18.9 g of polyethylene glycol 2000 [manufactured by Wako Pure Chemical Industries, Ltd., average molecular weight: 2,000] were put into a 200-mL flask and dissolved in 50 g of methyl ethyl ketone. The temperature was increased to 60° C., heating and stirring was performed for 30 minutes, 47 mg of NEOSTANN U-600 [manufactured by Nitto Kasei Co., Ltd.; bismuth tris(2-ethylhexanoate)] was added, heating and stirring were performed for 5 hours at 60° C. 1.3 g of methanol was added, and heating and stirring was further performed for 1 hour at 60° C., so as to obtain a 30-mass % polymer solution of Exemplary compound (1). The weight average molecular weight obtained by gel permeation chromatography (GPC) in terms of standard polystyrene was 77,000.

Synthesization of Exemplary Compound (2)

2.5 g of 4,4'-diphenylmethane diisocyanate [manufactured by Wako Pure Chemical Industries, Ltd.] and 18.0 g of polyethylene glycol 2000 [manufactured by Wako Pure Chemical Industries, Ltd., average molecular weight: 2,000] and 0.13 g of a dimethylolpropionic acid [manufactured by Tokyo Chemical Industry Co., Ltd.] were put into a 200-mL flask and dissolved in 52 g of methyl ethyl ketone. After the temperature was increased to 60° C. and heating and stirring was performed for 30 minutes, 51 mg of NEOSTANN U-600 [manufactured by Nitto Kasei Co., Ltd.; bismuth tris(2-ethylhexanoate)] was added, and heating and stirring was performed for 5 hours at 60° C. 1.5 g of methanol was added, and heating and stirring was further performed 1 hour at 60° C., so as to obtain a 30-mass % polymer solution of Exemplary compound (2). The weight average molecular weight obtained by GPC was 56,700.

Synthesization of Exemplary Compound (3)

2.5 g of 4,4'-diphenylmethane diisocyanate [manufactured by Wako Pure Chemical Industries, Ltd.], 17.6 g of polyethylene glycol 2000 [manufactured by Wako Pure Chemical Industries, Ltd., average molecular weight: 2,000, glass-transition temperature: −42° C.), 0.13 g of a dimethylolpropionic acid [manufactured by Tokyo Chemical Industry Co., Ltd.] and 0.16 g of BLEMMER GLM [manufactured by NOF Corporation; glycerin monomethacrylate] were put into a 200-mL flask and dissolved in 52 g of methyl ethyl ketone. 0.1 g of p-methoxyphenol was added, a temperature thereof was increased to 60° C., heating and stirring was performed for 30 minutes, 51 mg of NEOSTANN U-600 [manufactured by Nitto Kasei Co., Ltd.; bismuth tris(2-ethylhexanoate)] was added, and heating and stirring was further performed for 5 hours at 60° C. 1.5 g of methanol was added and heating and stirring was performed at 60° C. for 1 hours, so as to obtain a 30-mass % polymer solution of Exemplary compound (3). The weight average molecular weight obtained by GPC was 32,600. In addition, the glass-transition temperature obtained by DSC was −8° C.

<Method of Measuring Tg>

The glass-transition temperature (Tg) of the specimen formed by drying the obtained polymer solution was measured under the conditions below by using a differential scanning calorimeter "X-DSC7000" (manufactured by Seiko Instruments Inc.). The measurement was performed twice with the same specimens and the second measurement result was employed.

Atmosphere in measurement chamber: Nitrogen (50 mL/min)
Temperature rising rate: 5° C./min
Measurement starting temperature: −100° C.
Measurement ending temperature: 200° C.
Test pan: Aluminum pan
Mass of measurement specimen: 5 mg
Estimation of Tg: Tg was estimated by rounding half up by a decimal point or less of an intermediate temperature of the falling starting point and the falling ending point of a DSC chart.

Synthesization of Exemplary Compound (6)

2.5 g of 4,4'-diphenylmethane diisocyanate [manufactured by Wako Pure Chemical Industries, Ltd.], 9.5 g of polycarbonate diol (average molecular weight: 1,000) was put into a 200-mL flask and dissolved in 28 g of propylene glycol monomethyl ether acetate. A temperature was increased to 60° C., heating and stirring was performed for 30 minutes, 51 mg of NEOSTANN U-600 [manufactured by Nitto Kasei Co., Ltd.; bismuth tris(2-ethylhexanoate)] was added, and heating and stirring was performed for 5 hours at 60° C. 1.5 g of methanol was added and heating and stirring was performed at 60° C. for 1 hour, so as to obtain a 30-mass % polymer solution of Exemplary compound (6). The weight average molecular weight obtained by GPC was 53,600.

Synthesization of Exemplary Compound (16)

30.5 g of JEFFAMINE D-2000 [manufactured by Huntsman International LLC.; polyoxypropylenediamine, average molecular weight: 2,000] was put into a 500-mL flask provided with a thermometer, a thermometer, a stirrer, and a nitrogen introducing tube and dissolved in 82 g of N-methyl-2-pyrrolidone (NMP), and 4.5 g of 3,3',4,4'-biphenyltetracarboxylic anhydride [manufactured by Mitsubishi Chemical Corporation]. Stirring was performed at 60° C. for 4 hours, and cooling was performed to room temperature. 0.36 g of phthalic anhydride was added and stirring was performed for 10 hours, so as to obtain a slightly brown and transparent polyamic acid solution. The obtained 30-mass % polymer solution was analyzed by the GPC, so as to know that the weight average molecular weight was 95,200.

Spin coating was performed with polymer solution was on a glass substrate, heating and dehydration was performed at 250° C., and polyimidization was performed, so as to obtain a polyimide film of Exemplary compound (16). The weight average molecular weight obtained by the GPC was 87,300.

Synthesization of Exemplary Compound (22)

In a 500-mL flask provided with a thermometer, a stirrer, and a nitrogen introducing tube, 2.0 g of terephthalic anhydride [manufactured by Tokyo Chemical Industry Co., Ltd.] was dissolved in 200 mL of tetrahydrofuran (THF), and cooling was performed to 5° C. 10.3 g of triethylamine was added to this, 20.9 g of JEFFAMINE D-2000 [manufactured by Huntsman International LLC.; polyoxypropylenediamine, average molecular weight: 2,000] was divided and added over 30 minutes. Stirring was performed at room temperature for 3 hours, the obtained polymer solution was crystallized to methanol/wate (7/3), so as to obtain Exemplary compound (22). The weight average molecular weight obtained by GPC was 76,200.

Synthesization of Exemplary Compound (28)

20 g of propylene glycol monomethyl ether was added to a 500-mL flask provided with a thermometer, a stirrer, and a nitrogen introducing tube, and nitrogen substitution was performed at 80° C. 138 g of propylene glycol monomethyl ether solution with 7.3 g of phenylacrylamide, 40.0 g of M-230G [manufactured by Shin-Nakamura Chemical Co., Ltd., weight average molecular weight: 1,000], 0.21 g of glycidyl methacrylate [manufactured by Wako Pure Chemical Industries, Ltd.], 0.15 g of 2-hydroxyethyl methacrylate [manufactured by Wako Pure Chemical Industries, Ltd.], and 0.1 g of V-601 [manufactured by Wako Pure Chemical Industries, Ltd.] was dripped over 2 hours. After dripping was performed, heating and stirring was performed at 80° C. for 4 hours under the nitrogen atmosphere. 0.25 g of p-methoxyphenol, 1.5 g of dodecylamine, and 0.19 g of an acrylic acid were added to the polymer solution and heating and stirring was performed at 90° C. for 4 hours, so as to obtain the polymer solution of Exemplary compound (28). The weight average molecular weight obtained by GPC was 87,000.

Synthesization of Exemplary Compound (30)

2.5 g of 4,4'-diphenylmethane diisocyanate [manufactured by Wako Pure Chemical Industries, Ltd.] and 17.6 g of JEFFAMINE D-2000 [manufactured by Huntsman International LLC.; polyoxypropylenediamine, average molecular weight: 2,000] were put into a 200-mL flask and dissolved in 52 g of methyl ethyl ketone. A temperature was increased to 60° C., heating and stirring was performed for 30 minutes, 51 mg of NEOSTANN U-600 [manufactured by Nitto Kasei Co., Ltd.; bismuth tris(2-ethylhexanoate)] was added, and heating and stirring was performed for 5 hours at 60° C. 1.7 g of butylamine was added and heating and stirring was performed at 60° C. for 1 hours, so as to obtain a 30-mass % polymer solution of Exemplary compound (30). The weight average molecular weight obtained by GPC was 55,300.

Synthesization of Exemplary Compound (33)

35 mg of 2,6-di-t-butylphenol [manufactured by Wako Pure Chemical Industries, Ltd.], 12.6 g of 4-4'-diphenylmethane diisocyanate [manufactured by Wako Pure Chemical Industries, Ltd.], 1.8 g of 1,4-butane diol [manufactured by Wako Pure Chemical Industries, Ltd.], 1.6 g of BLEMMER GLM [manufactured by NOF Corporation; glycerin monomethacrylate], 1.5 g of 2,2-hydroxymethylbutanoic acid, and 10.0 g of polyethylene glycol 1000 (weight average molecular weight: 1,000, glass-transition temperature: –49° C.) were added to a 200-mL 3-necked flask and dissolved in 65 g of tetrahydrofuran. A temperature was increased to 60° C. in the dry atmosphere, heating and stirring was performed for 30 minutes, 89 mg of NEOSTANN U-600 [manufactured by Nitto Kasei Co., Ltd.; bismuth tris(2-ethylhexanoate)] was added, and heating and stirring was performed for 5 hours at 60° C. Thereafter, 2 g of methanol was added and the reaction was ended. The polymer solution was dripped to 500 mL of hexane, reprecipitation was performed, a supernatant liquid was decanted, and the obtained precipitate was heated and dried at 80° C. in vacuum, so as to obtain Exemplary compound (33). The weight average molecular weight obtained by GPC was 55,100. In addition, the glass-transition temperature obtained by DSC was 13° C.

Example 1

Preparation Example of Solid Electrolyte Composition 180 zirconia beads having a diameter of 5 mm was put into a zirconia 45-mL container (manufactured by Fritsch Japan Co., Ltd.), 9.0 g of an inorganic solid electrolyte LLT (manufactured by Toshima Manufacturing Co., Ltd.), 2.7 g of the 30% polymer solution of Exemplary compound (1) (solid content: 0.8 g), and 0.2 g of LiTFSI (manufactured by Sigma-Aldrich Corporation) were added, and 15.0 g of methyl ethyl ketone was introduced as a dispersion medium. Thereafter, the container was set to a planet ball mill P-7 manufactured by Fritsch Japan Co., Ltd., and mixing was continued for 2 hours at a rotation speed of 300 rpm, so as to obtain a solid electrolyte composition S-1. Other solid electrolyte compositions S-2 to 5-11 and T-1 to T-3 were manufactured in the same manner as the solid electrolyte composition S-1, except for changing configurations thereof to configurations disclosed in Table 1.

The configurations of the solid electrolyte compositions are collectively presented in Table 1.

Here, the solid electrolyte compositions S-1 to 5-11 are the solid electrolyte compositions according to the invention, and the solid electrolyte compositions T-1 to T-3 are comparative solid electrolyte compositions.

In addition, the solid electrolyte composition is simply referred to as the composition in Table 1.

TABLE 11

| Composition | Solid electrolyte | | Binder (Solid content) | | Soft/hard | Lithium salt | Dispersion medium | |
|---|---|---|---|---|---|---|---|---|
| S-1 | LLT | 90.0 | (1) | 8.0 | 100 | LiTFSI | 2.0 | MEK |
| S-2 | LLT | 95.0 | (1) | 4.0 | 100 | LiTFSI | 1.0 | MEK |
| S-3 | LLT | 95.0 | (1) | 5.0 | 100 | — | — | MEK |
| S-4 | LLZ | 95.0 | (2) | 4.0 | 82 | LiTFSI | 1.0 | MFG |
| S-5 | LLZ | 95.0 | (3) | 4.0 | 67 | LiTFSI | 1.0 | MFG |
| S-6 | LLZ | 95.0 | (6) | 4.0 | 100 | LiTFSI | 1.0 | MFG |
| S-7 | LLZ | 95.0 | (16) | 4.0 | 100 | LiTFSI | 1.0 | MFG |
| S-8 | LLZ | 95.0 | (22) | 4.0 | 100 | LiTFSI | 1.0 | MFG |
| S-9 | LLZ | 95.0 | (28) | 4.0 | 80 | LiTFSI | 1.0 | MFG |
| S-10 | LLZ | 95.0 | (30) | 4.0 | 100 | LiTFSI | 1.0 | MFG |
| S-11 | LLZ | 95.0 | (33) | 4.0 | 20 | LiTFSI | 1.0 | MFG |
| T-1 | LLT | 100.0 | — | — | — | — | — | MEK |
| T-2 | LLT | 90.0 | PEG | 10.0 | — | — | — | Ethanol |
| T-3 | LLT | 75.0 | PVdF | 23.0 | — | LiTFSI | 2.0 | THF/NMP |

<Explanatory Notes of Table>

Numbers in the table are indicated by mass ratio (%)

LLT: $Li_{0.33}La_{0.55}TiO_3$ (average particle diameter 3.25 μm)

LLZ: $Li_7La_3Zr_2O_{12}$ (average particle diameter: 5.06 μm, manufactured by Toshima Manufacturing Co., Ltd.)

PEG: Polyethylene glycol

PVdF: Polyvinylidene fluoride

THF: Tetrahydrofuran

NMP: N-methylpyrrolidone

MFG: Propylene glycol monomethyl ether

MEK: Methyl ethyl ketone

LiTFSI: $LiN(CF_3SO_2)_2$

Soft/hard: A molar ratio of the soft segment when the number of moles of the hard segment of the binder polymer was 100 (calculated from a feed amount)

In addition, PEG is used as a secondary battery disclosed in JP2007-066703A and PVdF is used as a secondary battery disclosed in JP2001-015162A.

Preparation of Composition for Positive Electrode of Secondary Battery 5 parts by weight of acetylene black, 270 parts by weight of N-methylpyrrolidone, 100 parts by weight of the positive electrode active substance presented in the section of the positive electrode in Table 2, and 75 parts by weight of the solid electrolyte composition were added to a planetary mixer (TK HIVIS MIX, manufactured by PRIMIX Corporation), and stirring was performed for 1 hour at a rotation speed of 40 rpm, so as to prepare the composition for the positive electrode of the secondary battery in Table 2.

Preparation of Composition for Negative Electrode of Secondary Battery 5 parts by weight of acetylene black, 270 parts by weight of N-methylpyrrolidone, 100 parts by weight of the negative electrode active substance presented in the section of the negative electrode in Table 2, and 75 parts by weight of the solid electrolyte composition were added to a planetary mixer (TK HIVIS MIX, manufactured by PRIMIX Corporation), and stirring was performed for 1 hour at a rotation speed of 40 rpm, so as to prepare the composition for the negative electrode of the secondary battery presented in Table 2.

Preparation of Positive Electrode for Secondary Battery

The composition for the positive electrode of the secondary battery prepared above was applied on an aluminum foil having a thickness of 20 μm by an applicator of which clearance can be adjusted, heating was performed for 1 hour at 80° C., heating was further performed for 1 hour at 110° C., and the applied solvent was dried. Thereafter, heating and pressurizing was performed by using a heat press machine such that an arbitrary density is obtained, and the positive electrode for the secondary battery was obtained.

Preparation of Electrode Sheet for Secondary Batteries

The solid electrolyte composition presented in the section of the electrolyte in Table 2 was applied to the positive electrode for the secondary battery prepared above by using an applicator of which clearance can be adjusted, heating was performed for 1 hour at 80° C., heating was further performed for 1 hour at 110° C., and a polymerizable composition was polymerized and cured at the same time of drying. Thereafter, the composition for the negative electrode of the secondary battery prepared above was applied, heating was performed for 1 hour at 80° C., heating was further performed for 1 hour at 110° C., and a polymerizable composition was polymerized and cured at the same time of drying. A copper foil having a thickness of 20 μm was matched with a negative electrode layer, heating and pressurizing was performed by using a heat press machine such that an arbitrary density is obtained, and electrode sheets for secondary batteries having Test Nos. 101 to 117 and c11 to c13 presented in Tables 2 were prepared.

<Evaluation of Binding Properties>

When an adhesive tape was applied to the electrode sheet for secondary batteries manufactured above and peeled off at a certain speed, an area ratio of an unpeeled sheet portion with respect to a peeled adhesive tape was used so as to evaluate binding properties.

A: 100%

B: 95% or greater and less than 100%

C: 80% or greater and less than 95%

D: 50% or greater and less than 80%

E: less than 50%

<Measurement of Ion Conductance>

A coin battery was manufactured by cutting the electrode sheet for secondary batteries obtained above into a disc shape having a diameter of 14.5 mm. The coin battery was inserted into a jig that can apply a pressure of 500 $kgf/cm^2$ between electrodes from the outside of the coin battery so as to be used in the electrochemical measurement.

Figure 2:
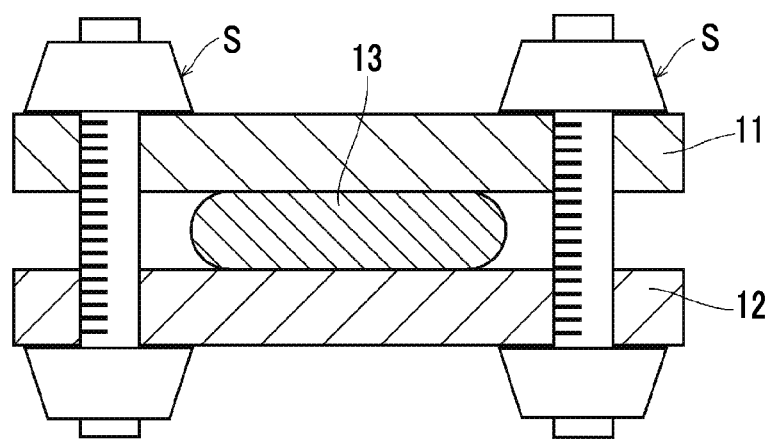
FIG. 2 is a side sectional view schematically illustrating a test device used in an example.

Ion conductance was obtained under pressurization (500 $kgf/cm^2$) and non-pressurization in an alternative current impedence method in a thermostat at 30° C. by using the coin battery obtained above. At this point, a test body illustrated in FIG. 2 was used for the pressurization of the battery. Reference numeral 11 denotes an upper support plate, Reference numeral 12 denotes a lower support plate, Reference numeral 13 denotes a coin battery, and Reference numeral S denotes a screw.

The configuration and the test results of the electrode sheet for secondary batteries are collectively presented in Table 2.

Here, Test Nos. 101 to 117 are electrode sheets for secondary batteries using the solid electrolyte compositions according to the invention, and Test Nos. c11 to c13 are electrode sheets for secondary batteries using the comparative solid electrolyte compositions.

In addition, in Table 2, the solid electrolyte composition is simply referred to as an electrolyte.

becomes unnecessary, and thus cycling properties becomes satisfactory.

Meanwhile, in a comparative example using the electrolytecomposition T-1, binding properties are deteriorated, and thus ion conductive in the non-pressurization state is deteriorated. In a comparative example using the polyethylene glycol T-2 only having a soft segment as a binding agent, it is expected that binding properties are deteriorated, and an adverse influence is applied to the battery characteristics. In a comparative example using the polyvinylidene fluoride

TABLE 2

| Test No. | Cell configuration | | | Binding properties | Ion conductance (mS/cm) | |
|---|---|---|---|---|---|---|
| | Positive electrode | Electrolyte | Negative electrode | | Pressurized | Non-pressurized |
| 101 | — | S-1 | — | B | 0.17 | 0.16 |
| 102 | LMO S-1 | S-1 | LTO S-1 | B | 0.10 | 0.09 |
| 103 | LMO S-1 | S-1 | Graphite S-1 | B | 0.11 | 0.10 |
| 104 | — | S-2 | — | A | 0.18 | 0.17 |
| 105 | LCO S-2 | S-2 | Graphite S-2 | B | 0.12 | 0.11 |
| 106 | — | S-3 | — | A | 0.15 | 0.13 |
| 107 | NMC S-3 | S-3 | Graphite S-3 | B | 0.11 | 0.10 |
| 108 | — | S-4 | — | A | 0.17 | 0.17 |
| 109 | NMC S-4 | S-4 | LTO S-4 | A | 0.11 | 0.11 |
| 110 | — | S-5 | — | A | 0.16 | 0.16 |
| 111 | LMO S-5 | S-5 | LTO S-5 | A | 0.12 | 0.12 |
| 112 | LMO S-6 | S-6 | LTO S-6 | A | 0.16 | 0.15 |
| 113 | LMO S-7 | S-7 | LTO S-7 | B | 0.12 | 0.11 |
| 114 | LMO S-8 | S-8 | LTO S-8 | B | 0.12 | 0.11 |
| 115 | LMO S-9 | S-9 | LTO S-9 | A | 0.11 | 0.11 |
| 116 | LMO S-10 | S-10 | LTO S-10 | B | 0.11 | 0.10 |
| 117 | LMO S-11 | S-11 | LTO S-11 | A | 0.15 | 0.15 |
| c11 | — | T-1 | — | E | 0.16 | 0.02 |
| c12 | — | T-2 | — | E | 0.14 | 0.05 |
| c13 | — | T-3 | — | D | 0.15 | 0.02 |

<Explanatory Notes of Table>

In addition, the following are abbreviations of active substances.

LMO: $LiMn_2O_4$ lithium manganese oxide

LTO: $Li_4Ti_5O_{12}$ lithium titanium oxide (Product name "ENERMIGHT LT-106", manufactured by Ishihara Sangyo Kaisha, Ltd.)

LCO: $LiCoO_2$ lithium cobalt oxide

NMC: $Li(Ni_{1/3}Mn_{1/3}Co_{1/3})O_2$ Lithium nickel manganese cobalt oxide

As clearly understood from the results presented in Table 2, the electrode sheet for secondary batteries and the stacked batteries which use the solid electrolyte composition according to the invention have excellent binding properties and also have excellent ion conductivity in the non-pressurization state. As a result, it is understood that, at the time of handling the electrode sheet while manufacturing, the solid electrolyte and the electrode active substance are not peeled off, electrochemical contacts on a solid interface can be maintained, a mechanism for pressurizing the electrodes T-3, binding properties are slightly deteriorated and ion conductive in the non-pressurization state is greatly deteriorated.

The invention is described with reference to specific embodiments, but, unless described otherwise, it is clear that any details are not intended to limit the invention, and the embodiments are widely construed without departing from the spirit and the scope of the invention recited in the accompanying claims.

This application claims the priority based on Japanese patent application 2013-198786 filed on Sep. 25, 2013 in Japan, and the entire contents thereof are incorporated herein by reference, as a part of the descriptions of this specification.

REFERENCE NUMERALS AND SYMBOLS

1 negative electrode collector
2 negative active substance layer
3 solid electrolyte layer
4 positive electrode active substance layer
5 positive electrode collector 6 operating position
10 all-solid-state secondary battery
11 upper support plate
12 lower support plate
13 coin battery
S screw

What is claimed is:

1. A solid electrolyte composition comprising:
an inorganic solid electrolyte having conductivity of an ion of metal belong to Group 1 or 2 in the periodic table; and
a high polymer binder,
wherein the high polymer binder is formed of a polymer having a hard segment and a soft segment and further having, as a third component other than the hard segment and the soft segment, a repeating unit having a hetero atom-containing group having at least one functional group selected from the group consisting of a carboxylic acid group, a sulfonic acid group, a tertiary amino group, a cyano group, a hydroxyl group, and a metal alkoxide group, and
wherein a content of the repeating unit having the hetero atom-containing group is 5 mol % to 30 mol % in the total polymer.

2. The solid electrolyte composition according to claim 1, wherein the hard segment forming the high polymer binder contains at least any one bond of an amide bond, an urea bond, an urethane bond, and an imide bond.

3. The solid electrolyte composition according to claim 1, wherein the soft segment forming the high polymer binder contains at least any one of a polyalkylene oxide chain, a polycarbonate chain, a polyester chain, and a silicone chain.

4. The solid electrolyte composition according to claim 1, wherein the polymer forming the high polymer binder includes a carbon-carbon unsaturated group.

5. The solid electrolyte composition according to claim 4, wherein the carbon-carbon unsaturated group is expressed by Formula (1) or (2) below,

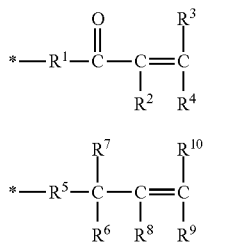

Formula (1)

Formula (2)

in Formulae (1) and (2), each of $R^1$ and $R^5$ independently represents an oxygen atom or $NR^N$, $R^N$ represents a hydrogen atom or an alkyl group, each of $R^2$ to $R^4$ and $R^6$ to $R^{10}$ independently represents a hydrogen atom or an alkyl group, and * represents a bonding position.

6. The solid electrolyte composition according to claim 1, wherein the polymer forming the high polymer binder has at least any one of repeating structures expressed by Formulae (I-1) to (I-5) of Group I below, as the hard segment, <Group I>

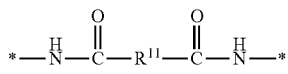 Formula (I-1)

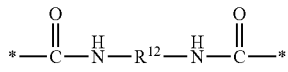 Formula (I-2)

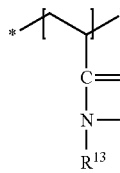 Formula (I-3)

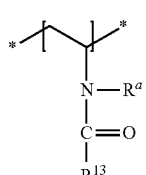 Formula (I-4)

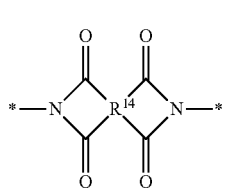 Formula (I-5)

in Formulae (I-1) to (I-5), each of $R^{11}$ and $R^{12}$ independently represents a bivalent linking group which is an alkylene group, an arylene group, or a combination thereof, $R^{13}$ represents an alkyl group, an alkenyl group, an aryl group, or an aralkyl group, $R^{14}$ represents an aromatic or aliphatic tetravalent linking group, $R^a$ represents a hydrogen atom or an alkyl group, and * represents a bonding position.

7. The solid electrolyte composition according to claim 1, wherein the polymer forming the high polymer binder has at least any one of repeating structures expressed by Formulae (II-1) to (II-5) of Group II below, as the soft segment, <Group II>

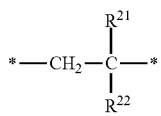 Formula (II-1)

 Formula (II-2)

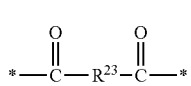 Formula (II-3)

 Formula (II-4)

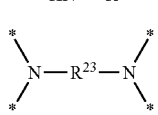 Formula (II-5)

in Formulae (II-1) to (II-5), $R^{21}$ represents a hydrogen atom or an alkyl group, $R^{22}$ represents a substituent group which contains a polyalkylene oxide chain, a polycarbonate chain, or a polyester chain and of which a weight average molecular weight is 200 to 200,000, $R^{23}$ represents a linking group which contains a polyalkylene oxide chain, a polycarbonate chain, or a polyester chain and of which a weight average molecular weight is 200 to 200,000, and * represents a bonding position.

8. The solid electrolyte composition according to claim 1, further comprising:
an electrode active substance.

9. The solid electrolyte composition comprising according to claim 8, wherein a ratio of a total mass of the inorganic solid electrolyte and the electrode active substance is in a range of 1,000 to 1 with respect to a mass of the high polymer binder.

10. The solid electrolyte composition according to claim 1,
wherein a molar ratio of the soft segment component to the hard segment component forming the high polymer binder is 1 mol to 10,000 mol with respect to 100 mol of the hard segment component.

11. An electrode sheet for batteries obtained by forming a film by disposing the solid electrolyte composition according to claim 1 on a metal foil.

12. An all-solid-state secondary battery comprising:
a positive electrode active substance layer;
a negative active substance layer; and
a solid electrolyte layer,
wherein at least any one of the positive electrode active substance layer, the negative active substance layer, and the solid electrolyte layer is formed of the solid electrolyte composition according to claim 1.

13. The solid electrolyte composition comprising according to claim 1, wherein a ratio of the inorganic solid electrolyte is in a range of 1,000 to 1 with respect to a mass of the high polymer binder.

14. A solid electrolyte composition comprising:
an inorganic solid electrolyte having conductivity of an ion of metal belong to Group 1 or 2 in the periodic table; and
a high polymer binder,
wherein the high polymer binder is formed of a polymer having a hard segment and a soft segment and further having a third component other than the hard segment and the soft segment, and
wherein the polymer has a repeating structure expressed by Formula (3) below,

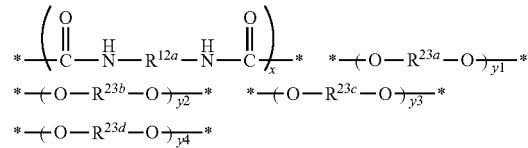

Formula (3)

in Formula (3), $R^{12a}$ represents an arylene group having 6 to 22 carbon atoms, an alkylene group having 1 to 15 carbon atoms, and a combination thereof, $R^{23a}$ represents an alkylene group having 2 to 6 carbon atoms, $R^{23b}$ represents an alkylene group having an acidic group of which an acid dissociation constant pKa is 14 or less or a basic group in which a pKa of a conjugate acid is 14 or less, $R^{23c}$ represents an alkylene group having a radical or cationic polymerizable group, $R^{23d}$ represents a diol residue having a molecular weight of 500 to 10,000, and a glass-transition temperature of $-100°$ C. to $50°$ C., x represents 40 mol % to 60 mol %, $y^1$ represents 0 mol % to 40 mol %, $y^2$ represents 1 mol % to 20 mol %, $y^3$ represents 1 mol % to 40 mol %, $y^4$ represents 1 mol % to 40 mol %, $x+y^1+y^2+y^3+y^4$ is 100 mol %, and * represents a bonding position.

* * * * *